US012719710B2

(12) United States Patent
Oren et al.

(10) Patent No.: US 12,719,710 B2
(45) Date of Patent: Aug. 25, 2026

(54) ENHANCED NOTIFICATIONS FOR IMPROVING INCLUSIVENESS IN ONLINE MEETINGS

(71) Applicant: MICROSOFT TECHNOLOGY LICENSING, LLC, Redmond, WA (US)

(72) Inventors: Navot Oren, Herzelia (IL); Shoham Dekel, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 20 days.

(21) Appl. No.: 18/957,543

(22) Filed: Nov. 22, 2024

(65) Prior Publication Data

US 2026/0149613 A1 May 28, 2026

(51) Int. Cl.
*H04L 12/18* (2006.01)
*G06F 40/20* (2020.01)

(52) U.S. Cl.
CPC .......... *H04L 12/1818* (2013.01); *G06F 40/20* (2020.01)

(58) Field of Classification Search
None
See application file for complete search history.

(56) References Cited

U.S. PATENT DOCUMENTS 11,956,286 B1 * 4/2024 Hassan ............... H04L 65/4015
2020/0304643 A1 9/2020 Abraham
2022/0224554 A1 7/2022 Hassan et al.
2022/0398065 A1 * 12/2022 Agrawal ................ H04N 7/147
2023/0208898 A1 6/2023 Deng
2023/0403309 A1 * 12/2023 Rathi ..................... G06Q 10/10

OTHER PUBLICATIONS

"Webex App | Play a notification sound when a participant raises a hand", Webex Help Center, Retrieved from URL: https://help.webex.com/en-us/article/6e4w6z/Webex-App-%7C-Play-a-notification-sound-when-a-participant-raises-a-hand, Retrieved on Jun. 8, 2024, 2 pages.
Raise hand in a meeting on Board, Desk, and Room Series, Webex Meetings, Retrieved from URL: https://help.webex.com/en-us/article/nasc6bd/Raise-hand-in-a-meeting-on-Board,-Desk,-and-Room-Series, Jul. 10, 2024, 3 Pages.
Extended European search report received in European Application No. 25212242.9, mailed on Mar. 16, 2026, 13 pages.

* cited by examiner

*Primary Examiner* — Natisha D Cox
(74) *Attorney, Agent, or Firm* — Scott Y. Shigeta; Newport IP, LLC

(57) ABSTRACT

The disclosed techniques provide dynamically controlled notifications that improve inclusiveness in online meetings. The dynamically controlled notifications can be audio or visual indicators that supplement a first notification. A user input causes the display of the first notification, an image of a "virtual hand raise." The input also invokes a timer for measuring an elapsed time from the time of the user input. The system also analyzes audio streams to detect topic transitions of a discussion of the meeting participants. Then, the system generates dynamically controlled notifications in response to at least one triggering event, either (1) in response to detecting that the timer has reached a time threshold or (2) in response to a detection of that the discussion has transitioned to a new topic. In some embodiments, the dynamically controlled notifications are invoked in response to either of the two triggering events, whichever event is detected first.

20 Claims, 21 Drawing Sheets

SYSTEM RECEIVES INPUT FROM THE FIRST USER 10A: DISPLAYS GRAPHICAL INDICATOR 121 AND STARTS TIMER 122

USER INTERFACE 101

Leave

121

151A

151B

Serena Davis

Miguel Silva

151C

151D

Krystal McKinney

Jazmine Simmons

People

Type Name or Number

IN THIS MEETING

Miguel Presenter

Krystal Presenter

Serena Audience

Jazmine Audience

⋮ ⋮

DISCUSSION 127

Miguel You can see from my sales report that Q1 deliveries were above target.

TIMER 122

124

THRESHOLD 125

122

129

100

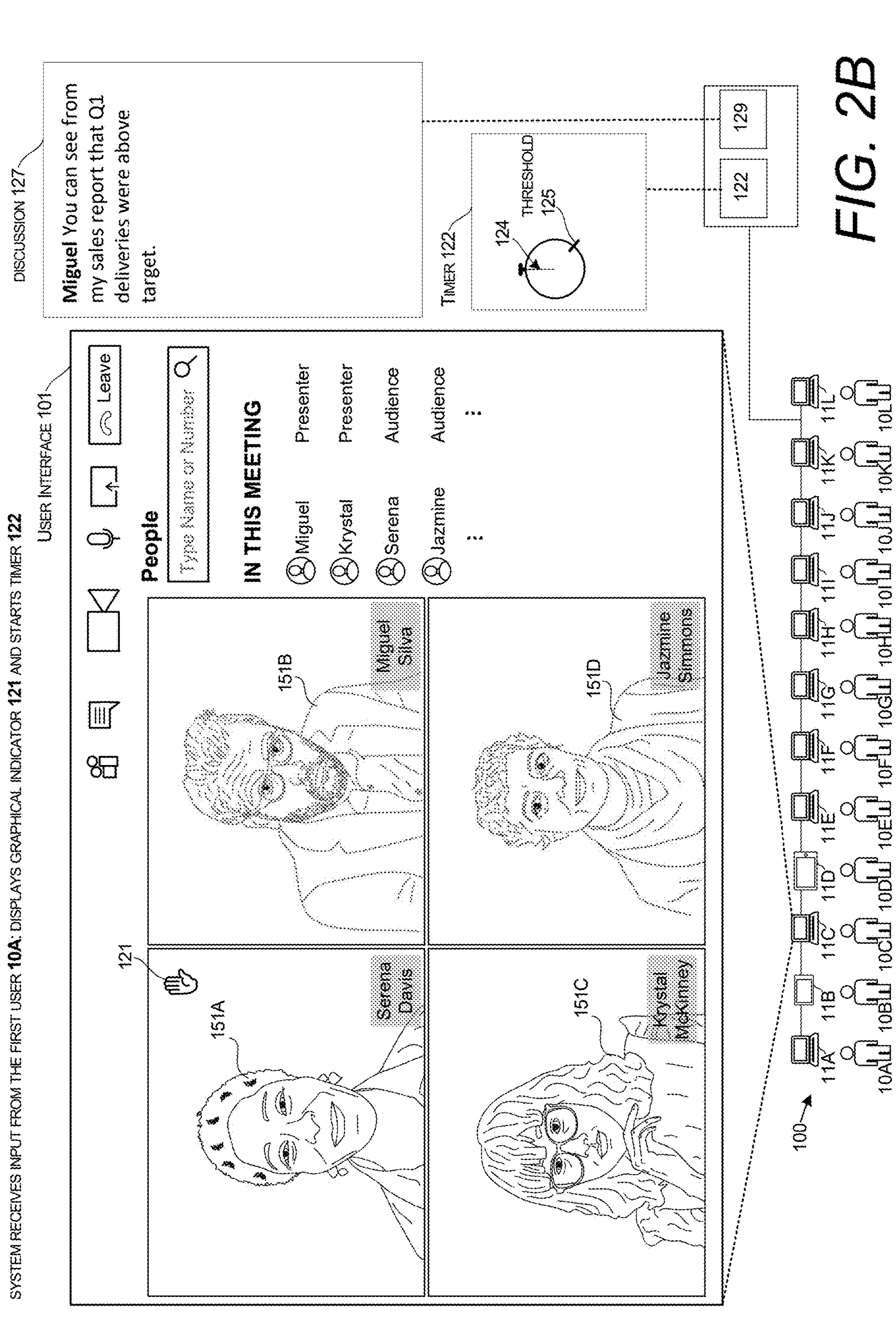

FIG. 2B

GENERATION OF DYNAMICALLY CONTROLLED NOTIFICATIONS 125 TO SUPPLEMENT A FIRST HAND RAISE NOTIFICATION 127

USER INTERFACE 101

128B
121
151A
Serena Davis
151B
Miguel Silva
151C
Krystal McKinney
151D
Jazmine Simmons Leave People Type Name or Number

IN THIS MEETING

Miguel Presenter
Krystal Presenter
Serena Audience
Jazmine Audience
⋮ ⋮

DISCUSSION 127

Miguel You can see from my sales report that Q1 deliveries were above target.

Krystal Thank you for providing that summary. I think that is all we need from the sales report

126

IDENTIFIED TOPIC CHANGE

Miguel OK, lets move to the next slide to discuss engineering strategies

TIMER 122
TIME OF INPUT 124
THRESHOLD 125
123 ELAPSED TIME 122
129

100

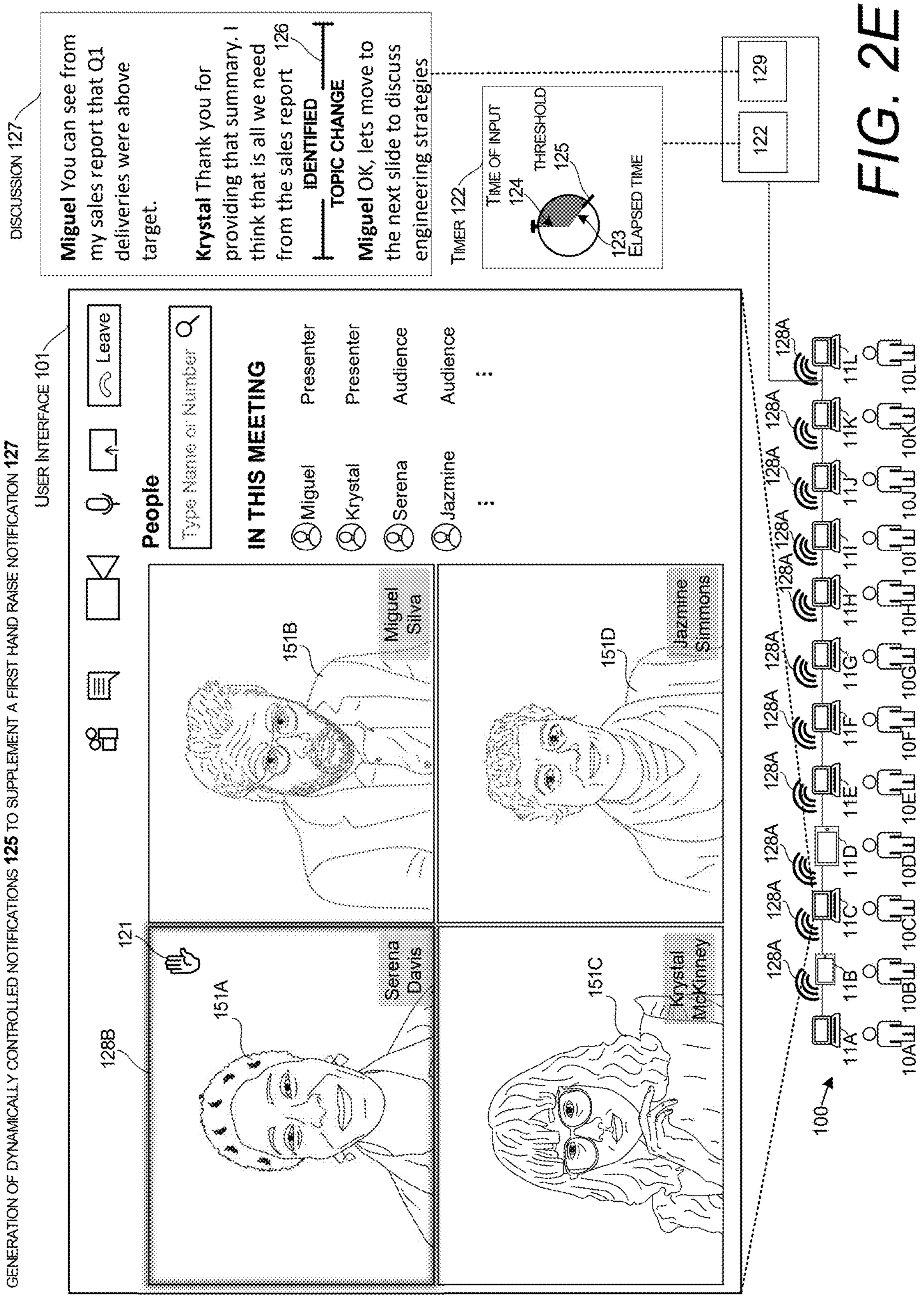

FIG. 2E

ADJUSTMENT OF THE TIME THRESHOLD. EXAMPLE: IF THE TIMER HITS A 2-MINUTE THRESHOLD A PREDETERMINED NUMBER OF TIMES, E.G., 3 TIMES, THE SYSTEM LOWERS THAT PARTICIPANT'S TIME THRESHOLD.

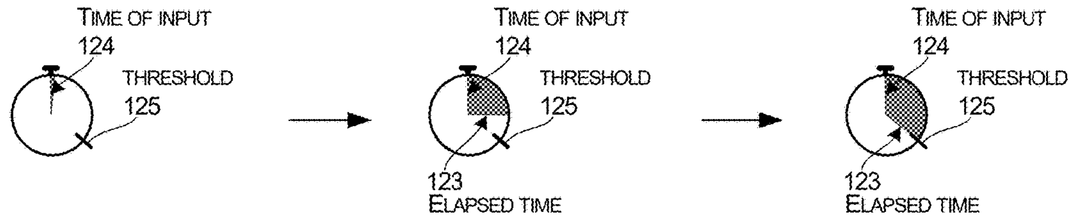

FIRST PARTICIPANT (USER 10A) PROVIDES A "HAND RAISE" INPUT INDICATING AN INTEREST TO SPEAK, AND THE ELAPSED TIME REACHES THE THRESHOLD

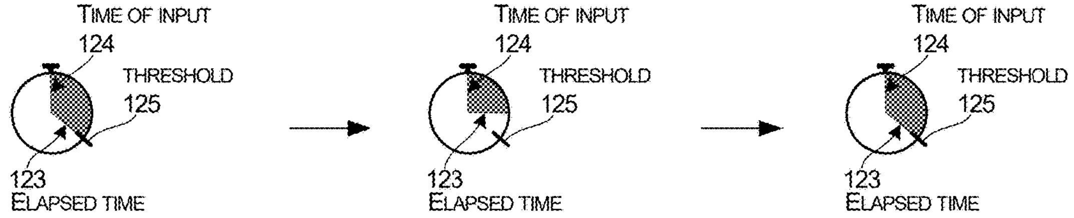

FIRST PARTICIPANT (USER 10A) PROVIDES A SECOND "HAND RAISE" INPUT INDICATING AN INTEREST TO SPEAK, AND THE ELAPSED TIME REACHES THE THRESHOLD FOR A SECOND TIME

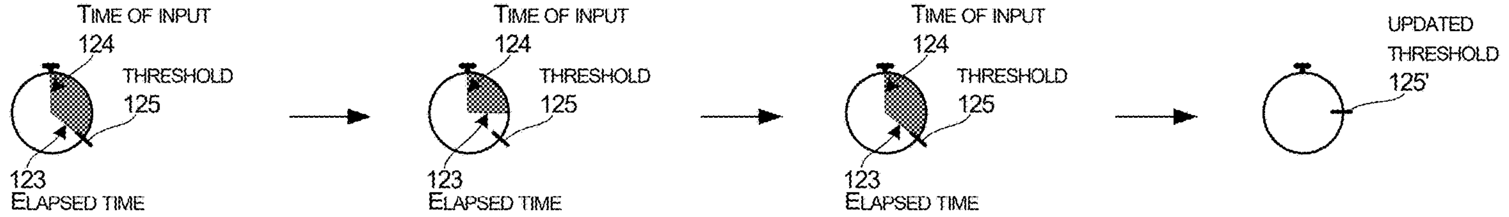

IN RESPONSE TO THE FIRST PARTICIPANT (USER 10A) PROVIDING THREE "HAND RAISE" INPUTS INDICATING AN INTEREST TO SPEAK, AND THE ELAPSED TIME REACHING THE THRESHOLD A THIRD TIME (A PREDETERMINED NUMBER OF TIMES), THE SYSTEM REDUCES THE THRESHOLD TIME PERIOD *125* TO AN UPDATED THRESHOLD 125'.

FIG. 5

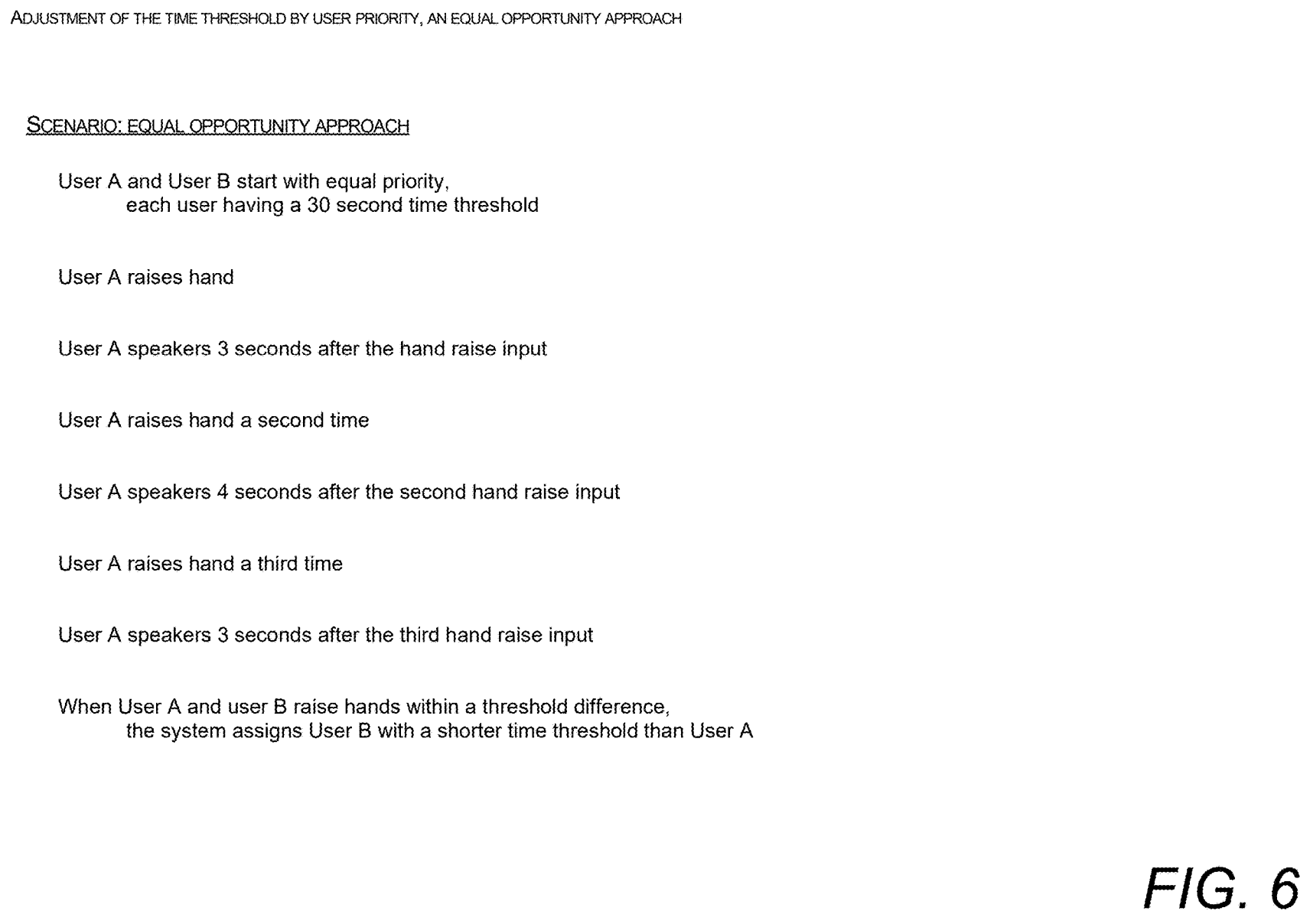

ADJUSTMENT OF THE TIME THRESHOLD BY USER PRIORITY, AN EQUAL OPPORTUNITY APPROACH

SCENARIO: EQUAL OPPORTUNITY APPROACH

User A and User B start with equal priority,
each user having a 30 second time threshold User A raises hand User A speakers 3 seconds after the hand raise input User A raises hand a second time User A speakers 4 seconds after the second hand raise input User A raises hand a third time User A speakers 3 seconds after the third hand raise input When User A and user B raise hands within a threshold difference,
the system assigns User B with a shorter time threshold than User A

FIG. 6

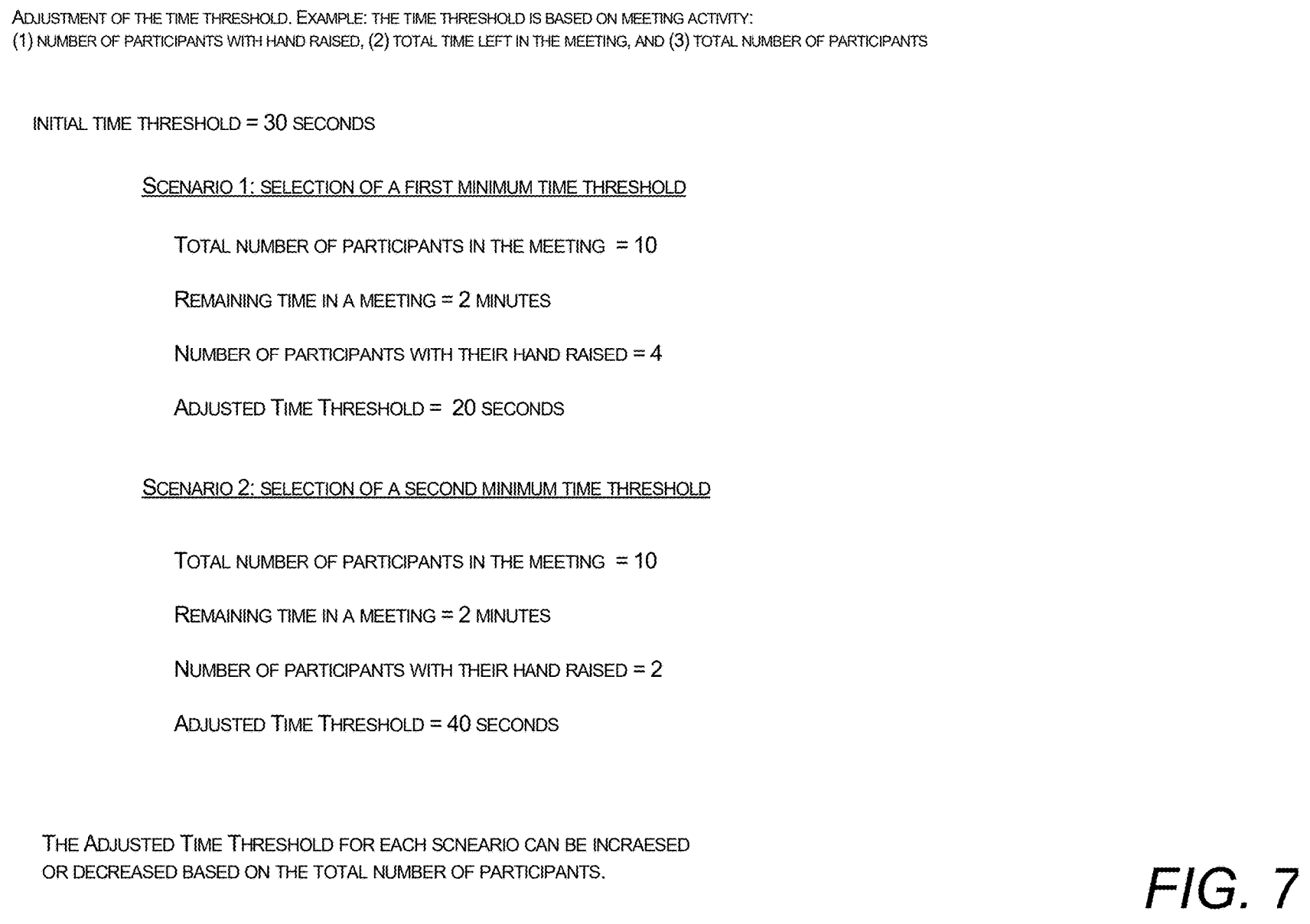

ADJUSTMENT OF THE TIME THRESHOLD. EXAMPLE: THE TIME THRESHOLD IS BASED ON MEETING ACTIVITY:
(1) NUMBER OF PARTICIPANTS WITH HAND RAISED, (2) TOTAL TIME LEFT IN THE MEETING, AND (3) TOTAL NUMBER OF PARTICIPANTS

INITIAL TIME THRESHOLD = 30 SECONDS

<u>SCENARIO 1: SELECTION OF A FIRST MINIMUM TIME THRESHOLD</u>

TOTAL NUMBER OF PARTICIPANTS IN THE MEETING = 10

REMAINING TIME IN A MEETING = 2 MINUTES

NUMBER OF PARTICIPANTS WITH THEIR HAND RAISED = 4

ADJUSTED TIME THRESHOLD = 20 SECONDS

<u>SCENARIO 2: SELECTION OF A SECOND MINIMUM TIME THRESHOLD</u>

TOTAL NUMBER OF PARTICIPANTS IN THE MEETING = 10

REMAINING TIME IN A MEETING = 2 MINUTES

NUMBER OF PARTICIPANTS WITH THEIR HAND RAISED = 2

ADJUSTED TIME THRESHOLD = 40 SECONDS

THE ADJUSTED TIME THRESHOLD FOR EACH SCNEARIO CAN BE INCRAESED OR DECREASED BASED ON THE TOTAL NUMBER OF PARTICIPANTS.

FIG. 7

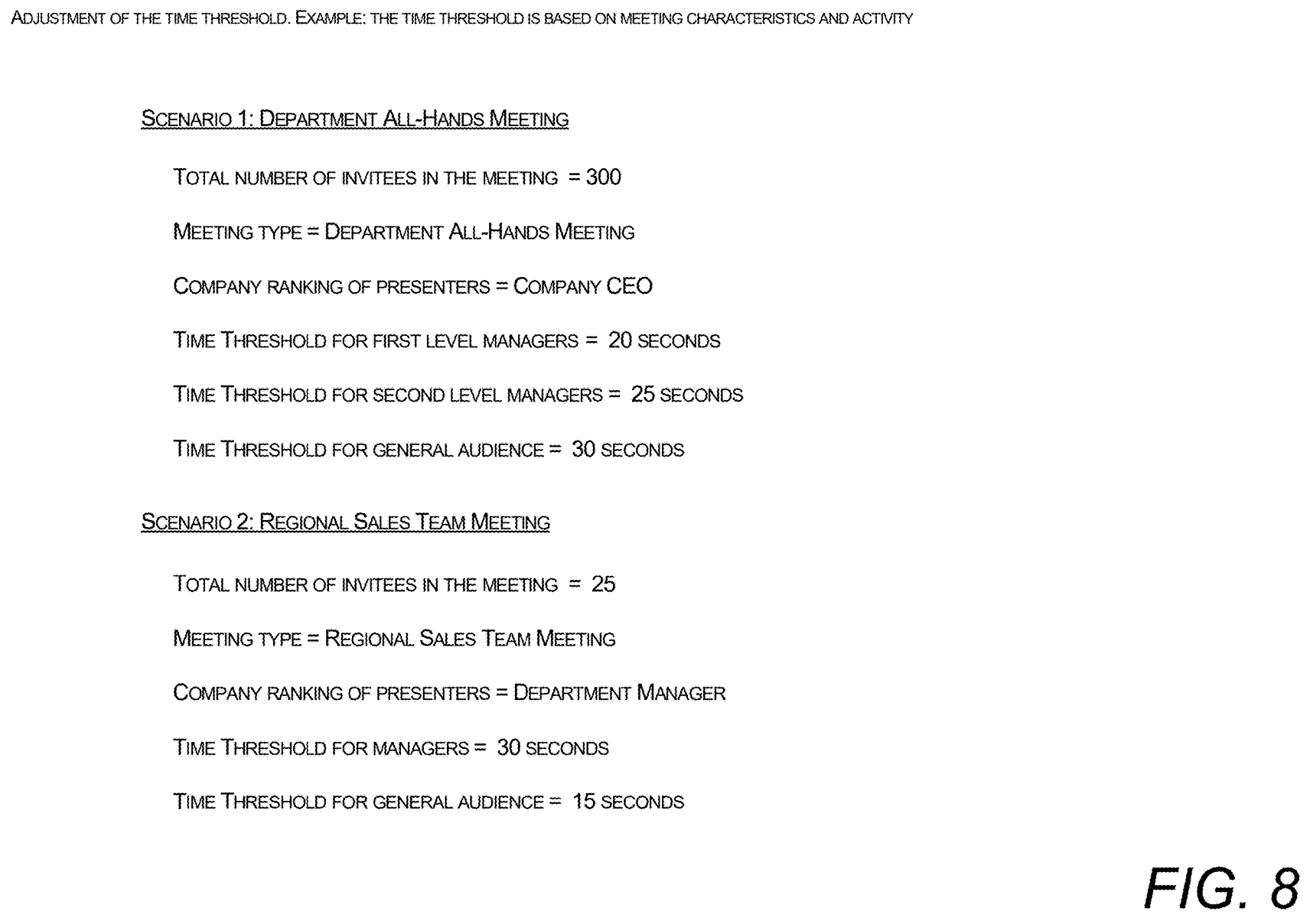

ADJUSTMENT OF THE TIME THRESHOLD. EXAMPLE: THE TIME THRESHOLD IS BASED ON MEETING CHARACTERISTICS AND ACTIVITY

SCENARIO 1: DEPARTMENT ALL-HANDS MEETING

TOTAL NUMBER OF INVITEES IN THE MEETING = 300

MEETING TYPE = DEPARTMENT ALL-HANDS MEETING

COMPANY RANKING OF PRESENTERS = COMPANY CEO

TIME THRESHOLD FOR FIRST LEVEL MANAGERS = 20 SECONDS

TIME THRESHOLD FOR SECOND LEVEL MANAGERS = 25 SECONDS

TIME THRESHOLD FOR GENERAL AUDIENCE = 30 SECONDS

SCENARIO 2: REGIONAL SALES TEAM MEETING

TOTAL NUMBER OF INVITEES IN THE MEETING = 25

MEETING TYPE = REGIONAL SALES TEAM MEETING

COMPANY RANKING OF PRESENTERS = DEPARTMENT MANAGER

TIME THRESHOLD FOR MANAGERS = 30 SECONDS

TIME THRESHOLD FOR GENERAL AUDIENCE = 15 SECONDS

FIG. 8

MEETING SUMMARY SHOWING MEETING INCLUSION METRICS

Transcribed User Statements 220

Transcript 129

System 100

Transcript 129

Transcript 129

Parameters 202

Query 201

System Devices 610

Large Language Model (LLM) 210

Topic Transition Notification 126

ENHANCED NOTIFICATIONS FOR IMPROVING INCLUSIVENESS IN ONLINE MEETINGS

BACKGROUND

There are a number of different types of collaborative systems that allow users to communicate. For example, some systems allow people to collaborate by sharing content using video and audio streams, shared files, chat messages, etc. Some systems provide user interface formats that allow users to share content with an audience. For example, a number of people can concurrently share live video streams to simulate an in-person meeting environment. This allows people to verbally communicate their ideas while also allowing them to communicate non-verbal gestures.

Although there are a number of different types of systems that allow users to collaborate, such systems still have a number of shortcomings. For example, when an on-line meeting includes a number of live video streams, such systems may not always provide all participants with an opportunity to speak. Inequities with respect to allocated speaking timeslots may be due to a number of reasons, including but not limited to, an agenda, personalities, or dynamics of the participants. Thus, even if some participants have important ideas to share, they may not have an opportunity to share those ideas in a meeting.

Some systems provide tools that give a user to have an opportunity to speak during meetings. For example, some systems have a virtual hand raise notification. If a person wishes to speak during a presentation of another participant, that person can provide an input to cause the display a graphical indicator, which can appear as an image of a raised hand. This is effective in some situations. Unfortunately, in meetings where there is a large number of participants or a number of people who wish to speak at once, such virtual hand raise gestures are often ignored. In other situations, when a virtual hand raise notification is ignored and the topic of the meeting changes, the virtual hand raise notification becomes less relevant. This may lead to a number of notifications with diminishing relevancy. In turn, reduced relevancy gives more reason for people to ignore such notifications and further reduces the effectiveness of the virtual hand raise feature.

SUMMARY

The disclosed techniques provide dynamically controlled notifications that improve inclusiveness in online meetings. A system generates dynamically controlled notifications, which include audio and/or visual indicators, that supplement an initial virtual hand raise notification. In one illustrative example, a user input causes the display of an initial notification in the form of an image, such as a "virtual hand raise," that is displayed to other users to let the other users know that the user would like to make a verbal contribution to a meeting. The input also invokes a timer for measuring an elapsed time from the time of the user input. The system also analyzes audio streams to detect topic transitions of a discussion of the meeting participants. The system generates dynamically controlled notifications to supplement the initial notification in response to at least one triggering event: (1) in response to detecting that the timer has reached a time threshold, and/or (2) in response to a detection that the discussion of the meeting has transitioned to a new topic. In some embodiments, the dynamically controlled notifications are invoked in response to the first of the two triggering events, e.g., a dynamically controlled notification is generated at the detection of the earlier of the two triggering events. This dynamic control of the supplemental notifications helps enable a user to contribute to a meeting before the meeting moves to a new topic. In some configurations, the system determines if an operational condition of the communication session has been met. This can include the analysis of both, or either (1) detecting that the timer has reached a time threshold, and/or (2) in response to a detection that the discussion of the meeting has transitioned to a new topic. This means that the system can perform both types of analysis but only perform an action if one, or both of the conditions have been met.

In some embodiments, a system can also dynamically adjust the time threshold for each participant individually to equalize inclusion further. The time threshold that is used to trigger the dynamically controlled notifications is adjusted based on one or more factors, including but not limited to, participant activity in a meeting, characteristics of the meeting participants, or characteristics of the meeting, etc. For example, when it comes to participant activity, if a person raises their hand on more than one occasion, and they are not given an opportunity to speak within a time threshold that is assigned to them, the time threshold for that person is reduced. The adjustment to the time threshold gives the person an increased opportunity to speak the next time they raise their hand. An adjustment to the time threshold can be made during a meeting and used for subsequent hand raise gestures in that same meeting. In addition, adjustments to the time threshold can be stored on the user profile and persistently stored across meetings. As described in more detail below, other types of activity, such as a user's participation level, can also be a factor in modifying the time threshold or other variables controlling the display of a notification. In other examples, characteristics of the meeting participants, such as a person's organizational rank position may also be used to adjust a time threshold or other variables controlling the display of a notification. Characteristics of a meeting, e.g., a number of participants, a type of meeting, e.g., all-hands meetings vs small group meetings, can also be used to adjust a time threshold or other variables controlling the display of a notification.

The disclosed techniques provide a number of technical improvements over existing systems. As stated above, some prior systems provide tools that help users with cues to help give them an opportunity to speak during meetings. Unfortunately, in meetings where there are a large number of participants or a number of people who wish to speak at once, some prior designs of virtual hand raise gestures are often ignored. When a virtual hand raise notification is ignored and the topic of a meeting changes, the virtual hand raise notification becomes less relevant. This may lead to a number of notifications with diminishing relevancy. This gives reason for people to ignore such notifications. Such issues discourage user engagement and reduce the efficacy of a meeting and the efficacy of a computer system. A system that does not promote user engagement can lead to production loss and other inefficiencies with respect to computing resources. For instance, participants of a communication session, such as an online meeting, may need to refer to recordings or other resources when content is missed or overlooked because of a lack of user engagement. Content may need to be re-sent when users miss salient points during a live meeting. Such activities can lead to inefficient use of a network, processor, memory, or other computing resources. Also, when a participant's level of engagement is negatively impacted during a meeting, such a loss of production may cause a need for prolonged meetings or follow-up meetings, which in turn take additional computing resources. Such production loss and inefficiencies with respect to computing resources can be exacerbated when a system is used to provide a collaborative environment for a large number of participants.

In addition to a loss in user engagement, a number of other inefficiencies can result when communication systems do not effectively display a live video of a person. Participants can miss important social cues, e.g., when a person raises their hand, begins to speak, looks in a certain direction, etc. Such shortcomings sometimes require users to manually interact with a number of different systems. For example, some users still send text messages or emails to other participants while in a conference call if a social cue was missed, or if a number of people did not get a chance to speak, etc. Such manual steps can be disruptive to a person's workflow and highly inefficient when it comes to helping a person establish a collaboration protocol with a group of people. Such drawbacks of existing systems can lead to loss of productivity as well as inefficient use of computing resources.

The enhanced notifications, e.g., the timing and use of the sounds and additional visual highlights also address the technical problems by providing a technical benefit by improving user interactions with devices, especially small-screen devices. The disclosed features overcome the existing technical problem in that, in order for a person to participate in a meeting and remain informed and have the ability to speak, participants may not see the first hand raise notification because of the screen size of a mobile device. Use of the second, timed notification that can include audio signals can help users with small screens that may have missed the first notification, but also mitigate issues with unnecessary, repeated notifications, particularly when the topic of a conversation has changed.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2B shows a state of the system where the first user provides an input showing an interest in speaking during a meeting.

FIG. 2E shows the state of the system where the system triggers an audio or visual indicator in response to a preset condition being met with respect to a detection of a new topic or a timer reaching a threshold.

FIG. 5 illustrates an example of how a system adjusts a time limit based on attempted hand raise activity of meeting participants.

FIG. 6 illustrates another example of how a system adjusts a time limit based on successful hand raise activity of meeting participants.

FIG. 7 illustrates examples of how a system adjusts a time limit based on characteristics of a meeting including a meeting type, a number of attendees, and roles of each attendee.

FIG. 8 illustrates examples of how a system adjusts a time limit based on characteristics of a meeting and meeting activity.

DETAILED DESCRIPTION

Figure 1:
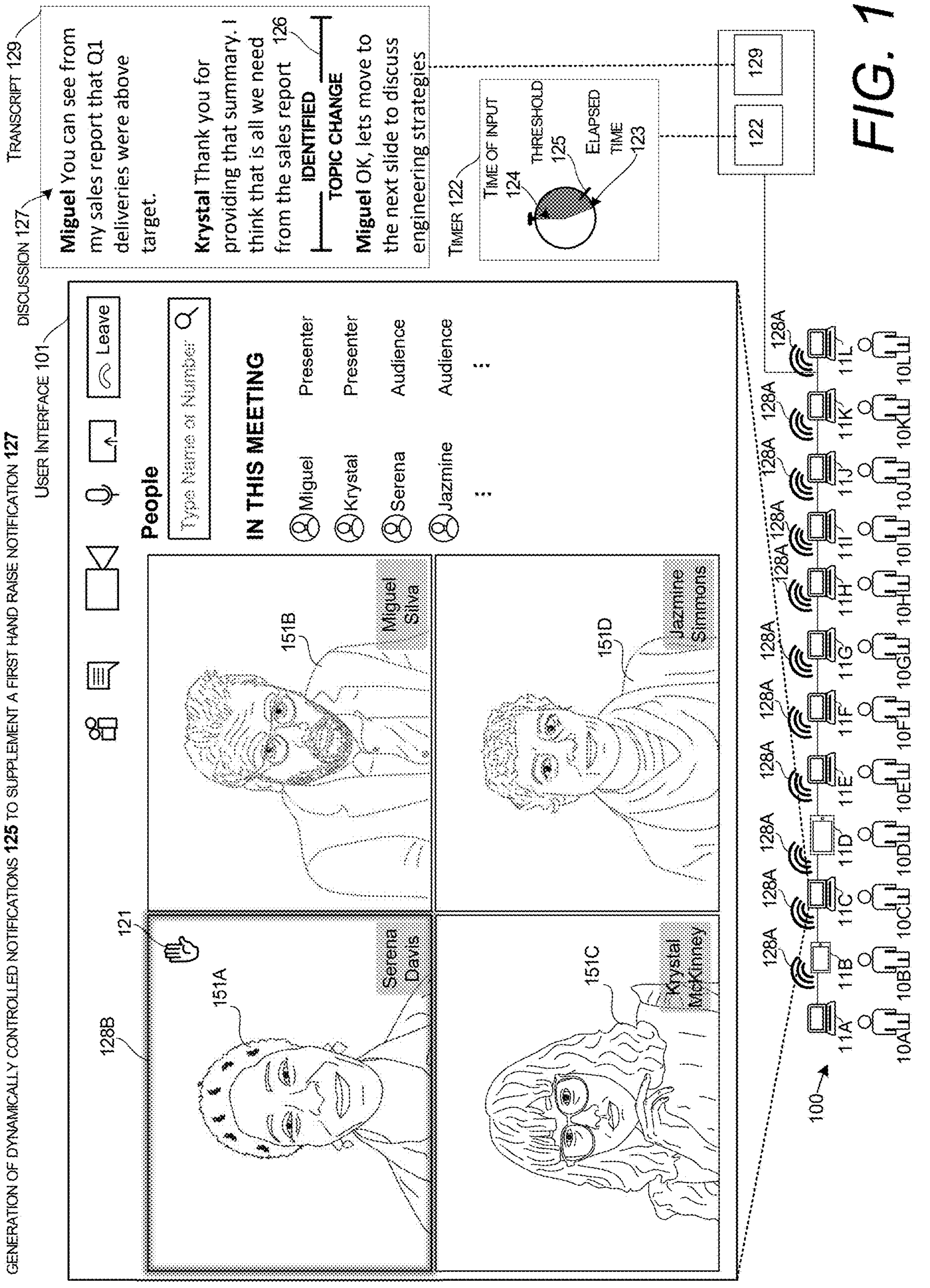
FIG. 1 illustrates an example system that generates dynamically controlled notifications that improve inclusiveness in online meetings.

FIG. 1 illustrates an example system 100 that generates dynamically controlled notifications 128 that improve inclusiveness in online meetings. One or more dynamically controlled notifications, which include audio notifications 128A and/or visual indicators 128B, are used to supplement a virtual hand raise notification 121. In one illustrative example, a user input causes the display of an initial notification 121 in the form of an image, such as a "virtual hand raise." The input also invokes a timer 122 for measuring an elapsed time from the time of the user input. The system also analyzes meeting audio streams, which are converted to a transcript 129, to detect topic transitions 126 of a discussion 127 of the meeting participants (10A-10L). Then, the system generates dynamically controlled notifications 128 in response to at least one triggering event, either (1) in response to detecting that an elapsed time 123 of the timer 122 has reached a time threshold 125 or (2) in response to a detection of that the discussion 127 has transitioned to a new topic. In some embodiments, the dynamically controlled notifications 128 are invoked in response to either of the two triggering events, whichever event is detected first. This dynamic control of the supplemental notifications helps enable a user to contribute to a meeting before the participants move on to a new topic. For illustrative purposes, the time threshold 125 is also referred to herein as a "threshold time limit 125" or a "time limit 125." The timer can measure a time from the input to the computing device 11A of the user 10A providing the input to the elapsed time of the meeting. The timer can also be initiated independently from the input, e.g., the hand-raise of the user. For example, the hand raise can be based on a predetermined combination of gestures, such as the user raising their hand and also trying to speak into a microphone that is in communication with the user's computer but muted to other meeting members.

In the example of FIG. 1, there are a number of users in a meeting, where User 1 10A, Serena Davis, is associated with a computing device 11A, User 2 10B, Miguel Silva, is associated with another computing device 11A, User 3 10C, Krystal Mckinney, is associated with another computing device 11C, and User 4 10D, Jazmine Simmons, is associated with yet another computing device 11D, and other users 10E-10L are associated with other corresponding devices 11E-11L. Each user 10 can be represented in a user interface 101 by a rendering 151, e.g., the first user 10A is represented by a first rendering 151A, the second user 10B is represented by a second rendering 151B.

The user interface can include a participant region, e.g., the regions in boxes, and another region for displaying participant status information, e.g., the region on the right that shows roles, participation levels, etc. In this example, Miguel and Krystal are active speakers. The active speaker has permissions to broadcast video and audio streams to all participants. Also, while those two users are active speakers, the system may restrict the other users from contributing to the audio broadcast of the meeting. Thus, in such embodiments, the other users, the first user 10A and users 10D-10L have muted microphones that are controlled by the system. In this scenario, a user with appropriate permissions such as a presenter or an administrator, can provide an input to activate the microphones of the other users. In some embodiments, these other users can also have the permissions needed to contribute to the audio broadcast of the meeting at any time. In such embodiments, the user may raise their hand to gain an opportunity to speak by use of social cues so they do not interrupt other users. The hand raise gesture notifies other users to give the requesting user an opportunity to speak.

Figure 2A:
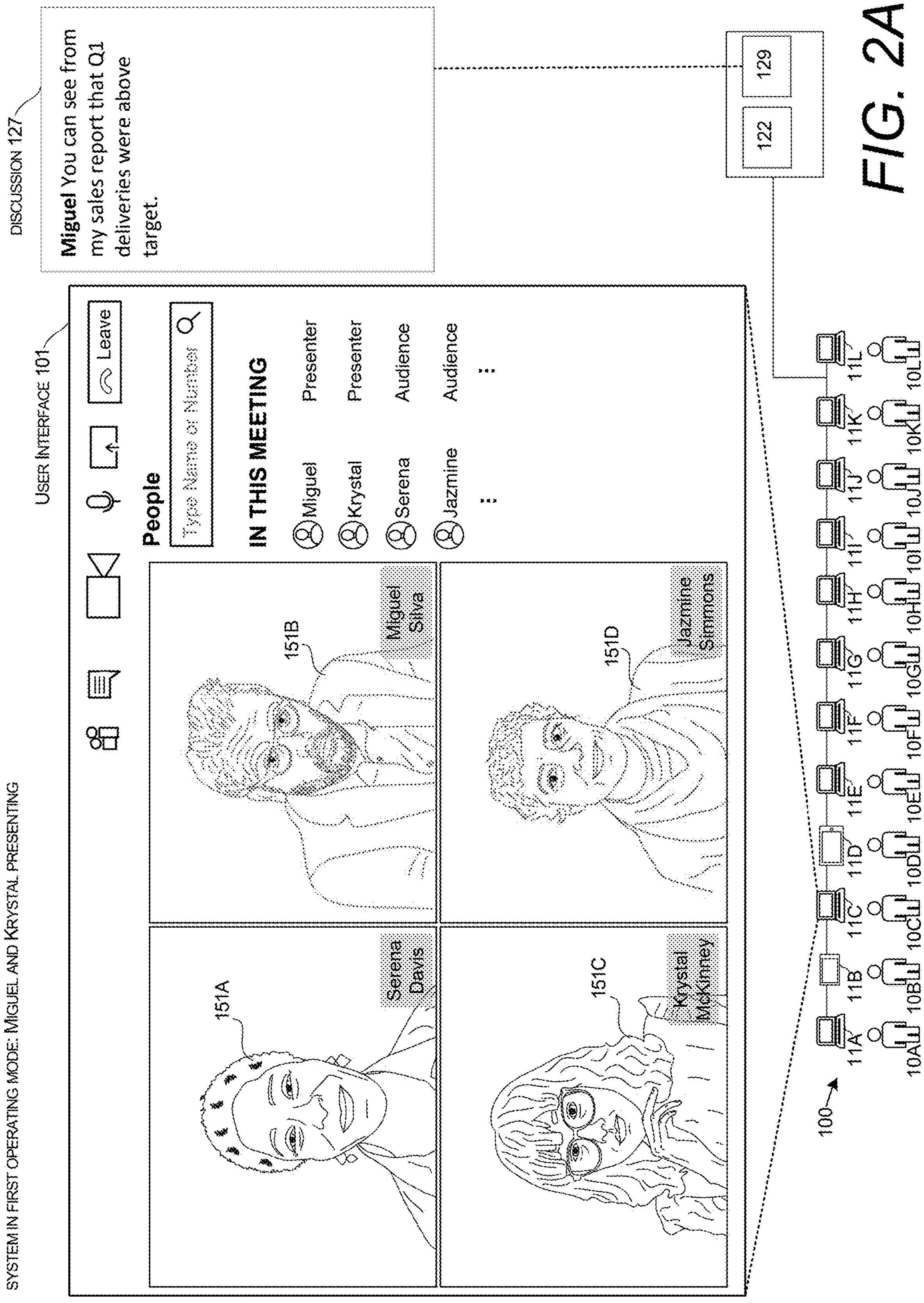
FIG. 2A shows a state of the meeting prior to a user providing an input to raise their hand.

Referring now to FIGS. 2A-2F, various stages of a process for invoking dynamically controlled notifications is shown and described below. FIG. 2A shows a state of the meeting prior to a user providing an input to raise their hand. In this example, in this state of the system, the second user 10B and the third user 10C are active speakers, and the other participants are active listeners.

FIG. 2B shows a state of the system where the first user 10A provides an input showing an interest to speak, e.g., they pressed a button or a camera captured a gesture that triggers a virtual hand raise. This can include operations for receiving an input from a computing device 11A of a first participant 10A for invoking an operating state transition of the system 100 granting the first participant 10A with speaker permissions. Also shown in FIG. 2B, after a raised hand function was invoked, the system automatically sets a timer that starts at the time of the raise hand input.

In some embodiments, in response to the input from the computing device 11A of the first participant 10A for invoking the operating state transition of the system, the system can display the first hand raise graphical indicator 121 to the other participants (10B-10L) on their respective devices (11B-11L). Also, the system monitors an elapsed time from the time of the hand raise input by initiating a timer 122 for measuring an elapsed time 123 from a time 124 the input is received from the first computing device 11A. The system also analyzes one or more audio streams of the communication session for detecting a topic transition 126 of a discussion 127 that is communicated through verbal speech encoded in the one or more audio streams. The analysis of the audio streams can involve in analysis of a live transcript of the meeting, and that analysis can be invoked by the input.

Figure 2C:
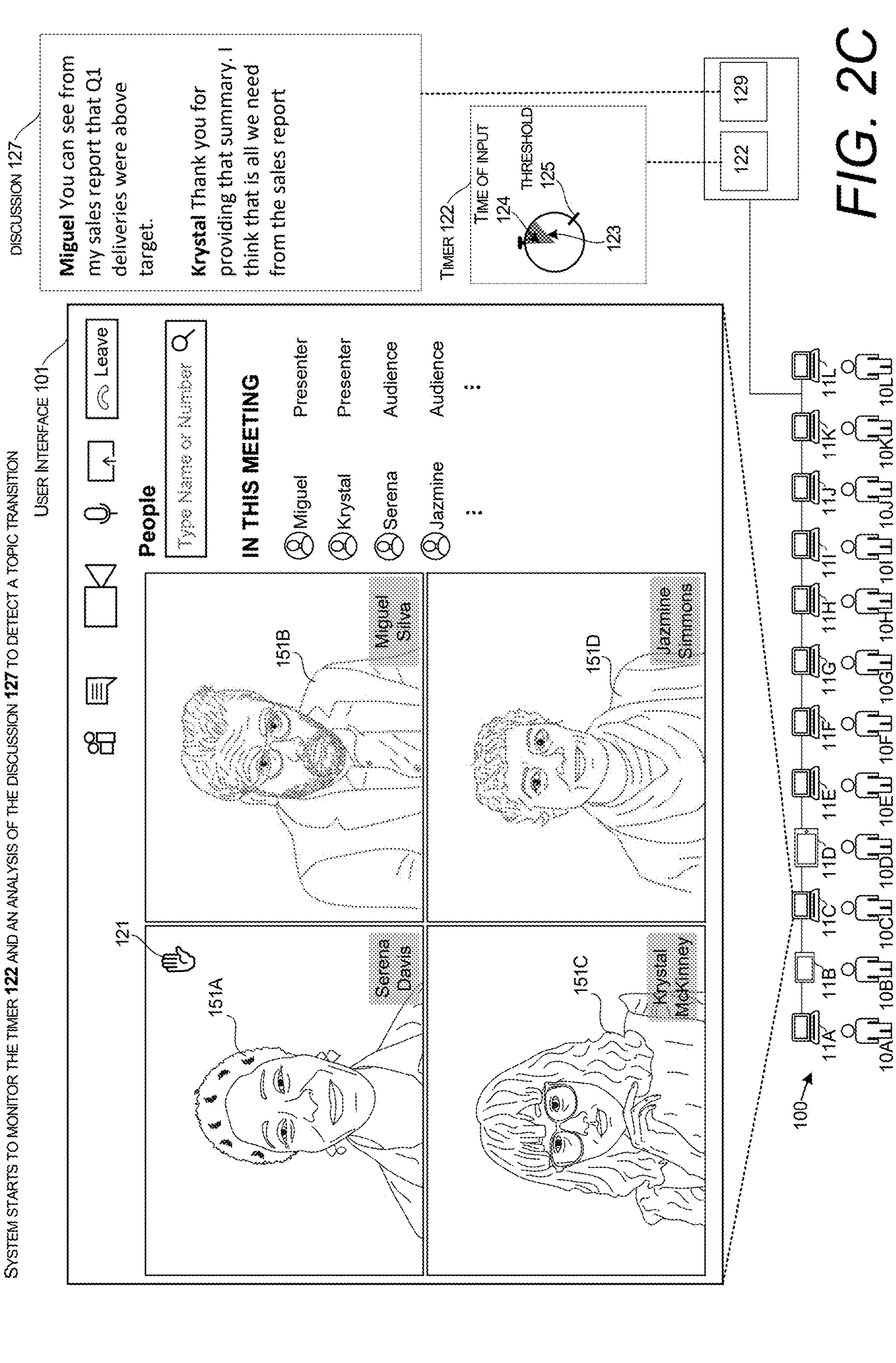
FIG. 2C shows a state of the system where the system continues to monitor the timer and also analyze one or more audio streams of the communication session for detecting a topic transition.

FIG. 2C shows a state of the system where the system continues to monitor the timer and also analyze one or more audio streams of the communication session for detecting a topic transition 126 of a discussion 127 that is communicated through verbal speech encoded in the one or more audio streams. In this state shown in this figure, the system has not detected a triggering event since the criteria has not been met.

Figure 2D:
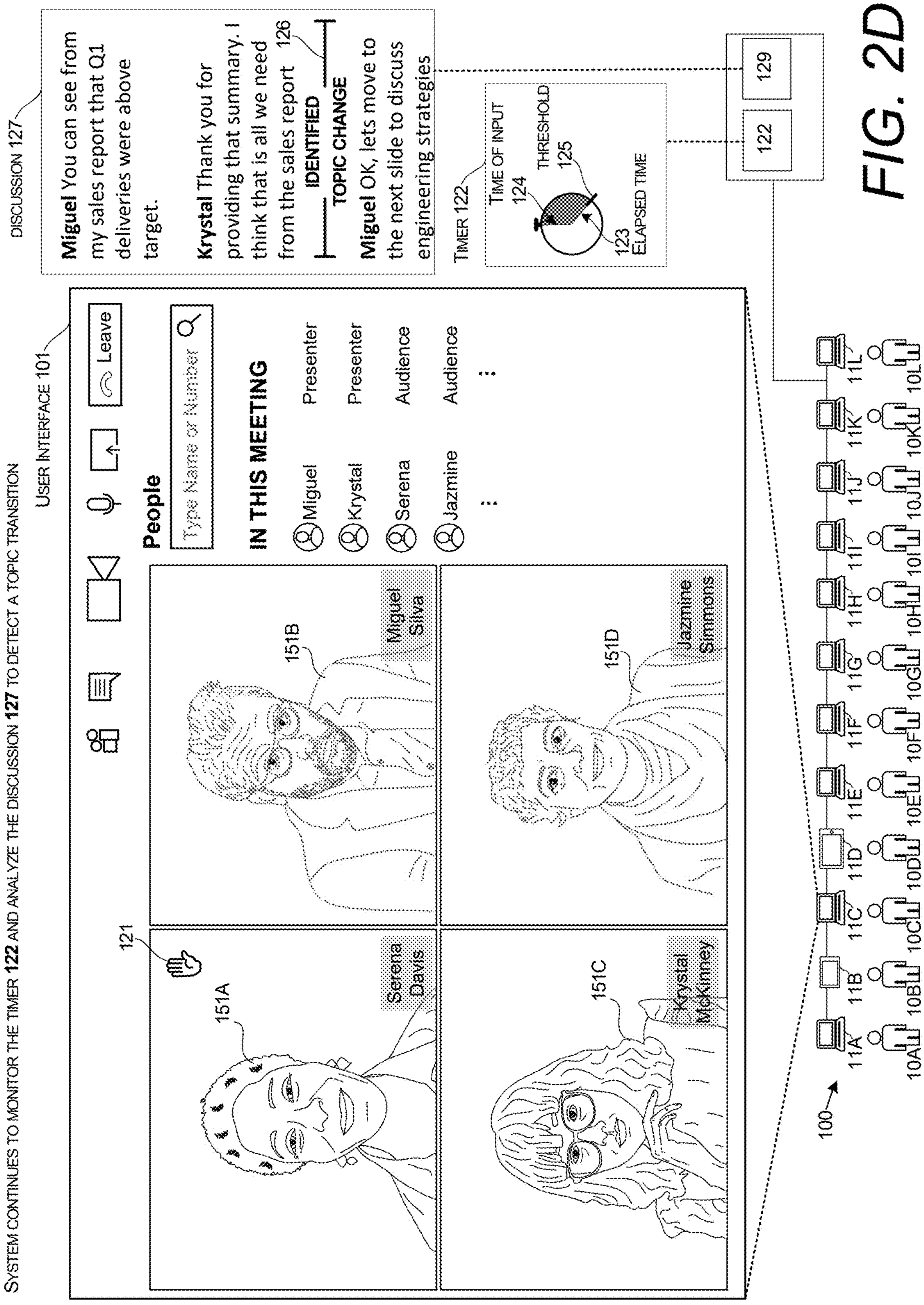
FIG. 2D shows a state of the system where it is determined that a new topic is being discussed and/or determined that the timer has met one or more criteria.

FIG. 2D shows a state of the system where it is determined that a new topic is being discussed and/or determined that the timer has met one or more criteria. In this example, the system has analyzed the audio streams of the communication session and detected a topic transition 126 of the discussion 127 that is communicated through verbal speech encoded in the one or more audio streams. In this example, Miguel and Krystal transition from a discussion regarding a report to a new topic that involves engineering strategies. As described in more detail below, this analysis to detect a new topic can involve the use of a large language model. Also shown in FIG. 2D, the system detects that the elapsed time 123 of the timer has reached or exceeded a time threshold 125 since the time of the input 124.

As shown in FIG. 2E, the system generates an audio indicator 128A and and/or a visual indicator 128B (collectively referred to herein as a dynamically controlled notification 128) in response to a preset condition being met. The present condition includes: (1) a timeout of the timer; and/or (2) a detection that the discussion topic has changed. In this example, in response to a first occurrence of either the topic transition detection or the elapsed time exceeding the threshold time limit, the system generates at least one notification 128 to supplement the graphical element 121 displayed on the individual computing devices, the notification 128 including at least one of an audio signal 128A generated at the individual computing devices, or a supplemental graphical indicator 128B for emphasizing a rendering 151A of the first participant 10A or an identifier of the first participant 10A. In another example of the notification 128, the system may also increase the size of the initial notification 121. The notification 128 can also include an audio signal with a person's name or identifier to state which person has raised their hand.

In one illustrative example, the system can include multiple thresholds. Individual thresholds can include a first time period, a second time period, a third time period, etc. Once an input is received to invoke the display of the initial notification 121 shown in FIG. 2B, the system can monitor the elapsed time from the input and as each time period is reached, the system can invoke an escalating notification. For example, when the elapsed time reaches the first time period, the system can display the initial notification 121 at a first size, such as the size shown in FIG. 2B. Then, when the elapsed time reaches the second time period, the system can increase the size of the initial notification 121. The system can increase the size each time the elapsed time reaches a subsequent time period. The system can also include other forms of escalating notifications. For instance, each time the elapsed time reaches an individual time period, the system can increase the intensity of a sound or light. In yet another example, each time the elapsed time reaches an individual time period, the system can change the color of the initial notification 121 or another an emitted light, e.g., start with a green color and transition to red color. For audible notifications, the system can start with a first tone at a first volume for a notification, then change the sound to a different tone and/or volume, e.g., increasing volume and/or frequency. These notifications can be executed individually or in any combination. The escalating notifications can also be applied to select computers. For example, an escalating notification can be invoked on a device of a person who is detected as a dominate speaker or invoked on a device of a person who is currently talking, or has spoken for a threshold amount of time in a meeting. This can focus the notifications on devices of people who are influencing the flow of a conversation or those who may have an influence on providing social cues to give another person a chance to speak. The escalating notifications can also be applied to users having predetermined roles, such as a meeting moderator or a person with a presenter role.

Figure 2F:
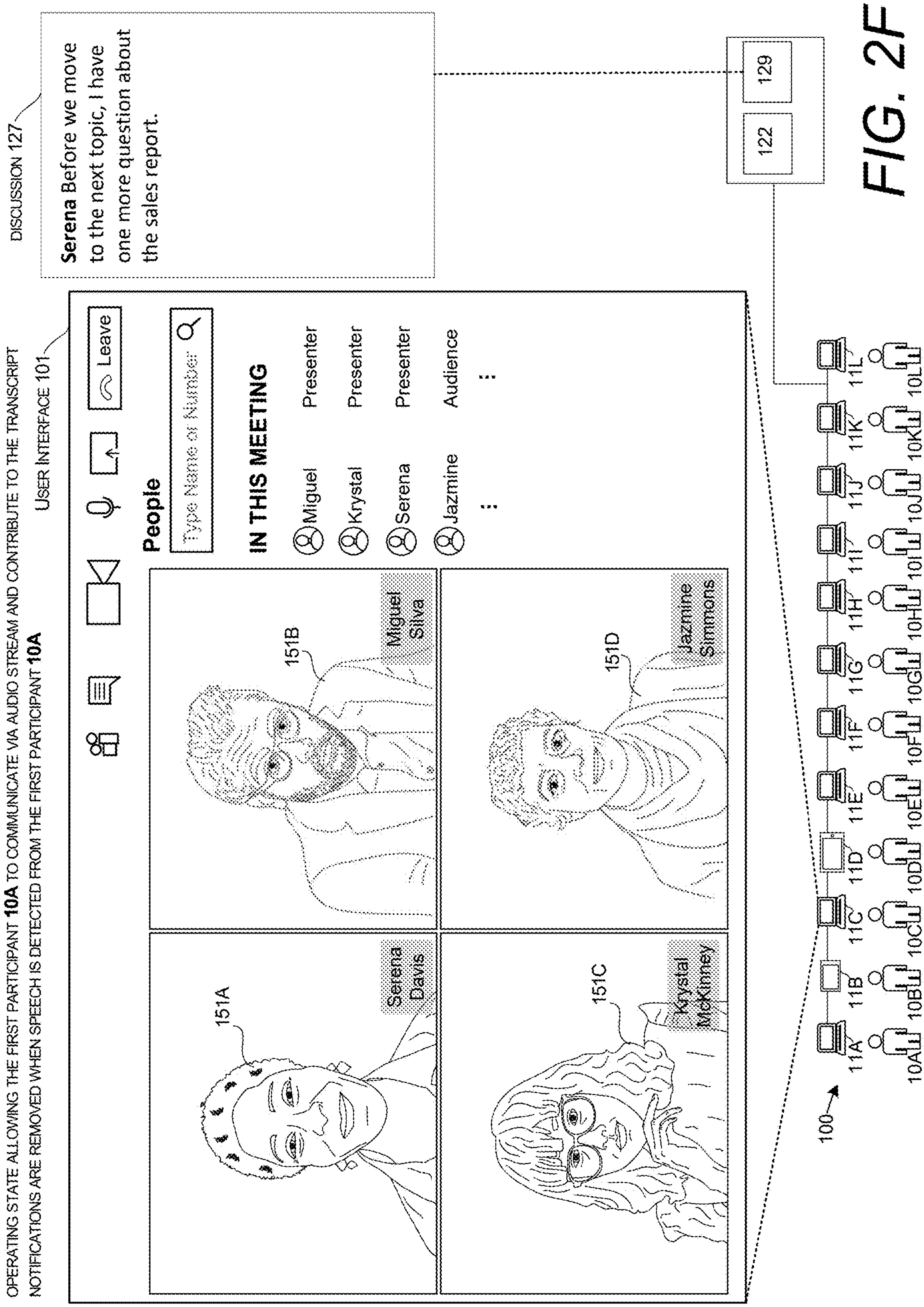
FIG. 2F shows a state of the system where a person who provided the input to raise their hand is granted permission to speak, which may be done by social cues or by changing system permissions.

FIG. 2F shows a state of the system where a person who provided the input to raise their hand is granted permission to speak. This can be achieved using different mechanisms. In a first embodiment, the system can modify permissions that activate a user's microphone. This can be achieved when a user with appropriate permissions, such as a moderator, changes permissions for the user to contribute audio streams to the meeting. The system can also automatically activate the participants microphone when one of the two triggering events are detected. This way the system can automatically control conversation flow based on timers and the detection of a topic change. In another embodiment, in a state where the user's microphone is continually active, and permissions, for that user are set to continually provide audio streams to the meeting, the user may be given a social cue to speak and contribute vocal input to the meeting.

FIG. 2F shows a state of the system where the system invokes an operating state transition by causing the activation of a microphone of the computing device of the first participant 10A to contribute audio from the microphone to the one or more audio streams. This is an optional set of operations in that the first participant maybe restricted from communicating audio to the meeting audio stream in a first operating state, and after permissions have been changed by the system or by a person, e.g., a meeting organizer or presenter, the permissions of the first participant are transitioned to a second operating state allowing that user to communicate audio to the meeting audio stream. In such an embodiment, the system may also change a person's role in a meeting to give others more context as to the person's status and level of contribution.

In the embodiments where the first participant's microphone is continually active, e.g., the system permissions allow the person to speak and contribute an audio stream to the meeting audio stream at all times, permissions do not need to be changed but the first person is given a social cue to speak instead. In such an embodiment, the system still transitions to a particular operating state in that the first participant is communicating audio in that particular operating state. In such an embodiment, the person's role may change when the person starts to speak and the system detects the speech using a sensor or an LLM. Also shown in FIG. 2F, when system detects that the user has talked, the audio notification 128A of each device may terminate, and the system removes the display of the supplemental notification 128B.

Figure 3A:
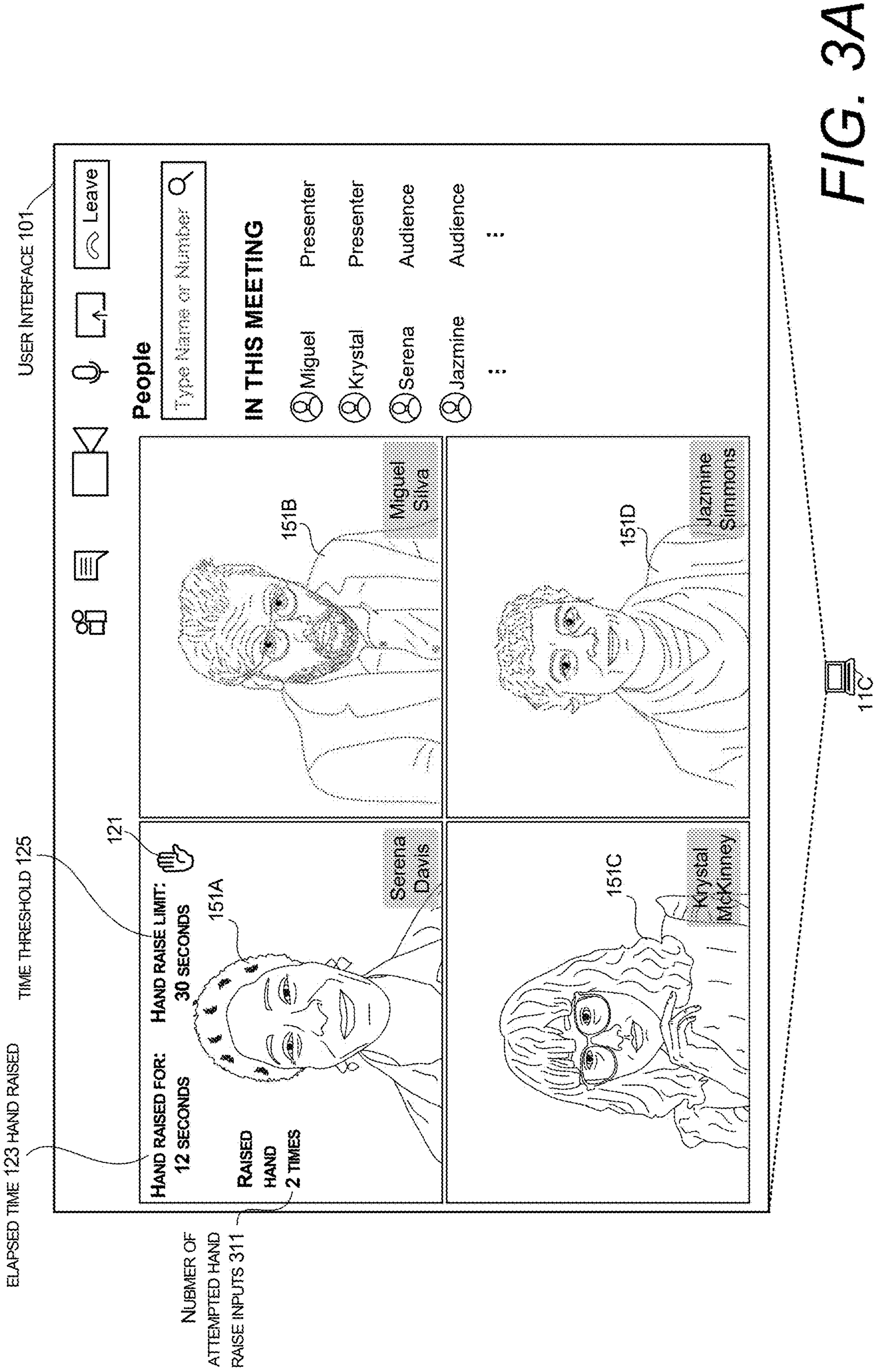
FIG. 3A shows a display of a counting timer showing an elapsed time of a hand raise gesture.

Now referring to FIGS. 3A-3B and 4A-4B, embodiments of a user interface having different types of displayed timers are shown and described below. As shown in FIG. 3A, a user interface can include an elapsed time that shows how long a person has maintained a virtual hand raise. This is a counting timer that starts at zero (0) when the participant provides an input, and counts up to the time limit, e.g., the threshold time limit. Also shown, the user interface also shows the time threshold 125, which in this example is 30 seconds. This helps all participants, including the user providing the input, e.g., the first participant 10A, by providing more context on a participant's request to speak. This timer may also be particularly helpful when multiple people have raised their hands, and all users can share display of how long each person has been waiting to speak.

In some embodiments, the user interface may also display a counter 311 for showing the number of times a person has raised their hand during a meeting and did not get a chance to speak. This counter is displayed in response to the system detecting hand raise and then determining that the person did not get a chance to speak. The detection of the user's vocal response may be achieved by the use of a volume sensor or LLM.

Figure 3B:
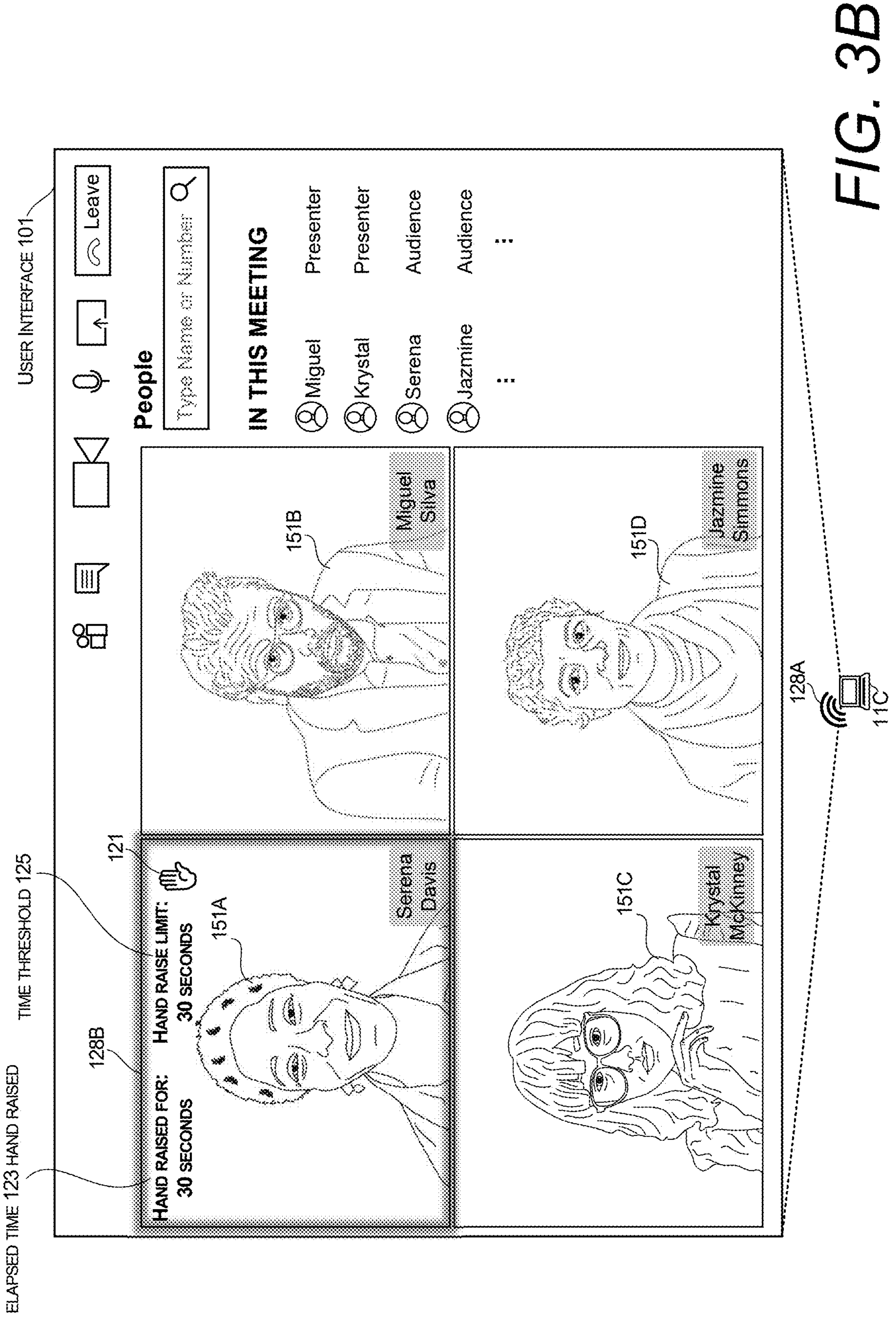
FIG. 3B shows a display of a supplemental notification displayed with a counting timer showing an elapsed time of a hand gesture.

As shown in FIG. 3B, when the system determines that the elapsed time has reached the time threshold, or when the system detects that a topic of the meeting discussion changes to a new topic, whichever condition is met first, the system displays generates a notification such as an audio signal 128A generated from each computer of each meeting participant or a visual indicator 128B. In this example, the timer shows that the first participant has waited for 30 seconds, which is displayed concurrently with the threshold time limit. At this time, the system may provide a social cue to speak, or the system may change permissions to activate that participants microphone.

Figure 4A:
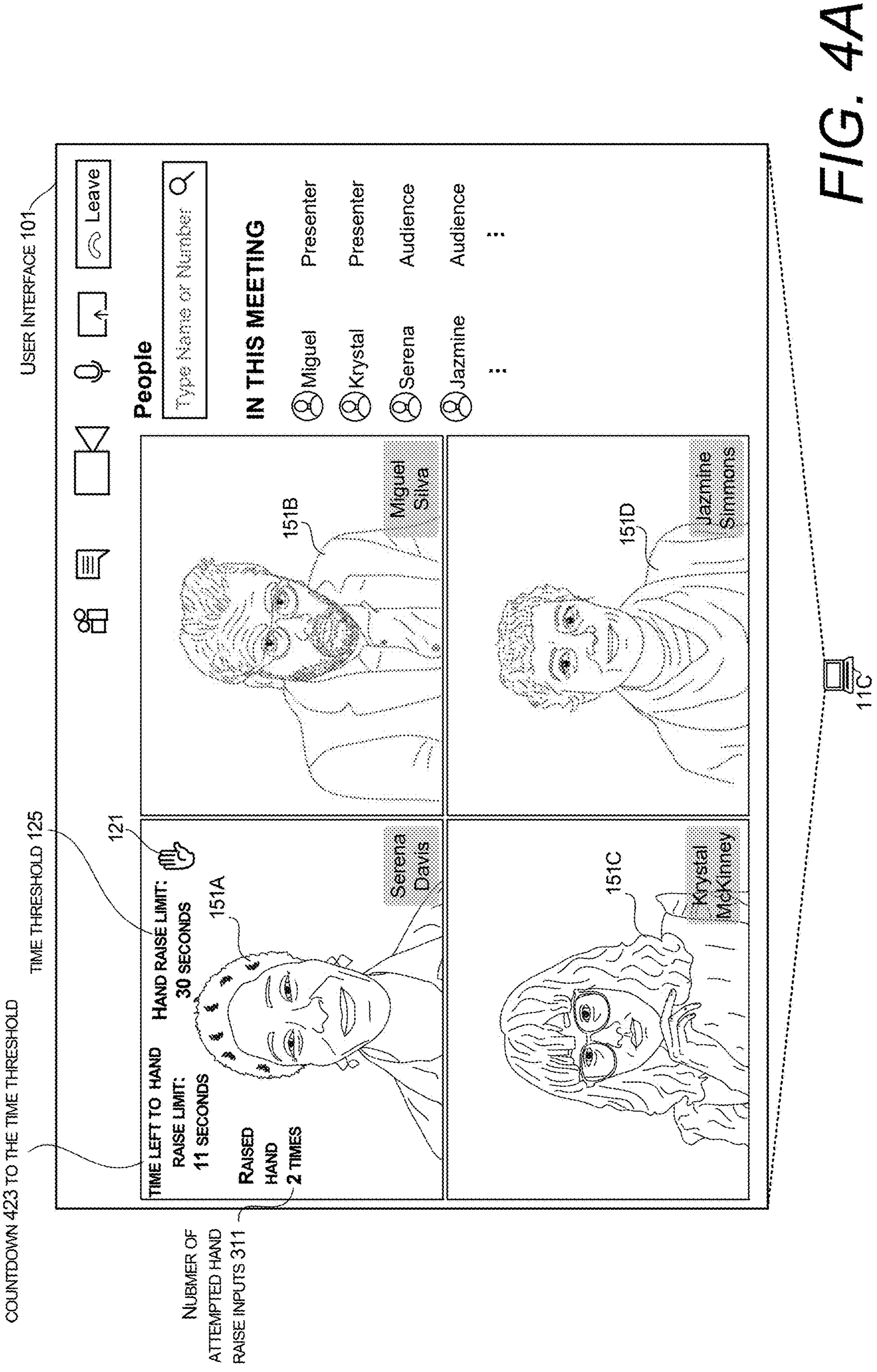
FIG. 4A shows a display of a countdown timer showing the remaining time of a hand raise gesture.

The example shown in FIG. 4A includes a user interface that displays a countdown timer 423, which shows the amount of time that is left until the system reaches the threshold time limit. This is a counting timer that starts at the threshold time limit, e.g., 30 seconds, and counts down to zero (0) to show that the threshold time limit has lapsed. Also shown, the user interface also shows the time threshold 125, which in this example is 30 seconds. This helps all participants, including the user providing the input, e.g., the first participant 10A, by providing more context on a participant's request to speak. This timer may also be particularly helpful when multiple people have raised their hands, and all users can share display of how long each person has been waiting to speak.

In some embodiments, the user interface may also display a counter 311 for showing the number of times a person has raised their hand during a meeting and did not get a chance to speak. This counter is displayed in response to the system detecting hand raise and then determining that the person did not get a chance to speak. The detection of the user's vocal response may be achieved by the use of a sensor or LLM.

Figure 4B:
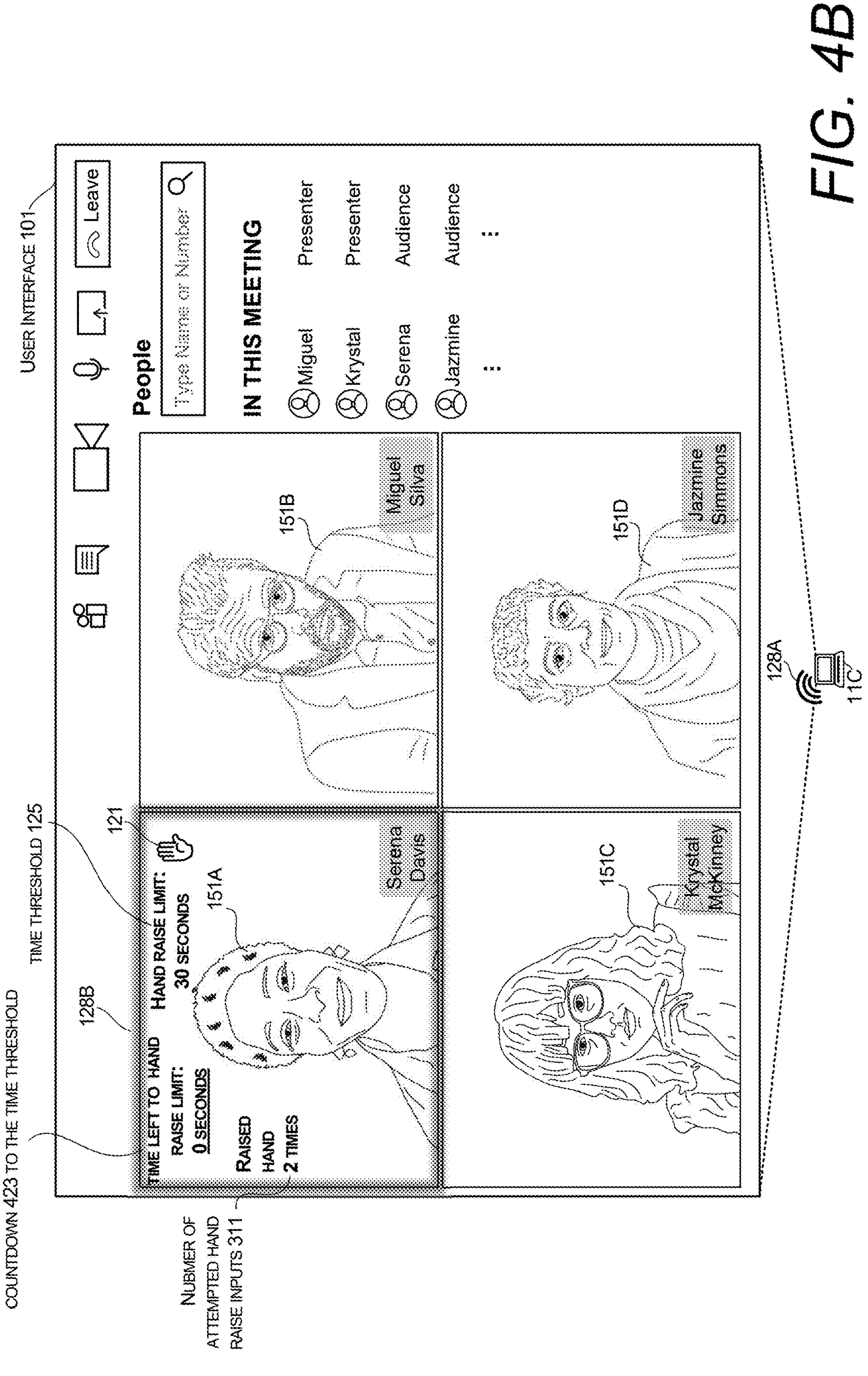
FIG. 4B shows a display of a supplemental notification displayed with a countdown timer showing the remaining time of a hand gesture.

As shown in FIG. 4B, when the system determines that the elapsed time has reached the time threshold, or when the system detects that a topic of the meeting discussion changes to a new topic, whichever condition is met first, the system displays generates a notification such as an audio signal 128A generated from each computer of each meeting participant or a visual indicator 128B. In this example, the countdown timer 423 shows that there is 0 seconds left, which is displayed concurrently with the threshold time limit. At this time, the system may provide a social cue to speak, or the system may automatically change permissions to activate that participants microphone.

Now referring to FIG. 5 through FIG. 8, various techniques for causing an adjustment of the threshold time limit are shown and describe below. Specifically, FIG. 5 shows an embodiment that involves the dynamic adjustment of the time threshold based on unsuccessful attempts of a participant using the hand raise feature. This occurs when a person raises their hand, e.g., provides an input causing a display of a virtual hand raise image, and the system does not detect a vocal input, e.g., because the person did not have an opportunity to make a vocal contribution or because someone with permissions did not activate that person's microphone.

In this embodiment, the time threshold that is used to trigger the dynamically controlled notification 128 is adjusted based on the participant's unsuccessful attempt to speak after using the hand raise feature a predetermined number of times. The time threshold is reduced in response to the detection of multiple failed events where the user submitted a request to speak using the hand raise feature but was not actually contribute verbal input to the meeting. In this example, if the timer meets or exceeds a time threshold, e.g., 2-minutes, a predetermined number of times, e.g., 3 times, the system lowers that participant's time threshold.

As shown in the top row, the first participant 10A provides a "hand raise" input indicating an interest to speak, and the elapsed time reaches the time threshold. In the time threshold, the system does not detect any vocal input from the first participant 10A. As shown in the second row, the first participant 10A provides a second "hand raise" input indicating an interest to speak. In this example, the elapsed time reaches the time threshold again. In the time threshold from the second input, the system does not detect any vocal input from the first participant 10A. Then again, as shown in the third row, the first participant 10A provides a third "hand raise" input indicating an interest to speak. In this example, the elapsed time reaches the time threshold a third time. In the time threshold from the third input, the system does not detect any vocal input from the first participant 10A. In response to these predetermined number of events (e.g., 3 hand raise events) where the person did not speak within the threshold time limit after invoking each of the hand raise inputs, the system can reduce the time threshold to an updated time threshold 125', which is a shorter time period than the original time threshold 125.

FIG. 6 illustrates another example of how a system adjusts a time limit based on successful hand raise activity of meeting participants. This feature is referred to herein as the equal opportunity approach promote inclusion in meetings. This may involve an analysis of meeting activity where the system monitors the number of times a person has spoken in a meeting after they raise their hand, and each person is compared relative to one another. To illustrate this embodiment, consider a scenario where a first user (User A) raises their hand, and then speaks within a threshold time (e.g., 10 seconds) after that hand raise. If that first user repeats that process where they raise their hand and then speaks within the threshold time after the input, the system keeps a count of those occurrences of that combination of activities: a hand raise followed by the detection of verbal contribution. When the counter reaches a counter threshold, the system can prioritize other speakers over that particular participant that has contributed successfully to a meeting audio stream.

In a continuation of the example above, after the first user (User A) repeats that cycle of providing a virtual hand raise followed by a verbal contribution, if a second user (User B) raises their hand concurrently with a hand raise of the first user (User A), the system gives priority to the second user and shortens the threshold time limit of the second user. This can also occur when User A raises hand and speaks a threshold number of times, then when User A and User B raise their hands within a threshold difference, the time threshold is reduced for User B since the system has detected User A's prior speech activity. This helps equalize presence of a meeting in that first user has already had a number of opportunities to speak, this feature gives the second user an opportunity to have more inclusion in the meeting.

FIG. 7 illustrates another example where user activity can be used to adjust a time threshold for select users. In this example, the system adjusts the time threshold based on a number of total participants in the meeting, the number of hand raises provided by each participant, and the time remaining in a meeting. The system starts with an initial time threshold for each participant. This example includes an initial time threshold of 30 seconds for each participant. The system can select one of two minimum thresholds based on number of total participants in the meeting, the number of hand raises provided by each participant, and the time remaining in a meeting. In general, the system can analyze the number of people that have raised their hands and then divide the remaining time in a meeting by the number of hand raises in a meeting. The total number of participants in a meeting can also increase or decrease the newly adjusted time thresholds.

In the first example shown in the top row, if there are 10 people in a meeting, there is 2 minutes remaining in a meeting, and four (4) participants have their hands raised using the virtual hand raise feature, the system selects a first minimum time threshold, e.g., 20 seconds. This is based on the division of the remaining time between the number of hand raises minus a predetermined buffer value to give each person time to speak, e.g., 30 seconds remaining for each user minus 10 seconds for each person to allocate time for each person to speak.

In another example, shown in the second row, if there are 10 people in a meeting, there is 2 minutes remaining in a meeting, and two (2) participants have their hands raised using the virtual hand raise feature, the system selects a second minimum time threshold, e.g., 40 seconds. This is based on the division of the remaining time between the number of hand raises minus another predetermined buffer value to give each person time to speak, e.g., 60 seconds remaining for each participant minus 20 seconds for each person to allocate time for each person to speak. As shown, the predetermined buffer value is increased in this example to utilize the increased remaining time. The predetermined buffer value can be increased or decreased based on total number of participants in the meeting.

FIG. 8 illustrates another example where the system sets one or more time thresholds based on characteristics of a meeting. These examples are based on one or more factors including, but not limited to, a total number of invitees, a meeting type, and a ranking of attendees. In one example, a set of time thresholds for attendees having one or more roles can include: a first time threshold for first level managers to be 20 seconds, a second time threshold for second level managers to be 25 seconds, and a third time threshold for general audience members to be 30 seconds. This set of thresholds can be selected if the meeting includes a threshold ranking for presenters, e.g., a CEO, at a meeting having 300 invitees, and a meeting type as an all-hands meeting. In another example, another set of thresholds for attendees having one or more roles can include: a first time threshold for managers to be 30 seconds, and a time threshold for general audience members to be 15 seconds. This second set of thresholds can be selected if the meeting includes a second threshold ranking for presenters, e.g., a department manager, at a meeting having over 20 invitees, and a meeting type as a regional sales team meeting.

These examples are provided for illustrative purposes and are not to be construed as limiting. It can be appreciated that any factor disclosed herein can be used to increase or decrease a particular time threshold for a particular role of a participant in a meeting. Any change these example parameters can also increase or decrease a time threshold for any particular participant in a meeting. For instance, if the first scenario includes a presenter with a lower organizational ranking, the system can increase or decrease the time thresholds for each participant.

Figure 9:
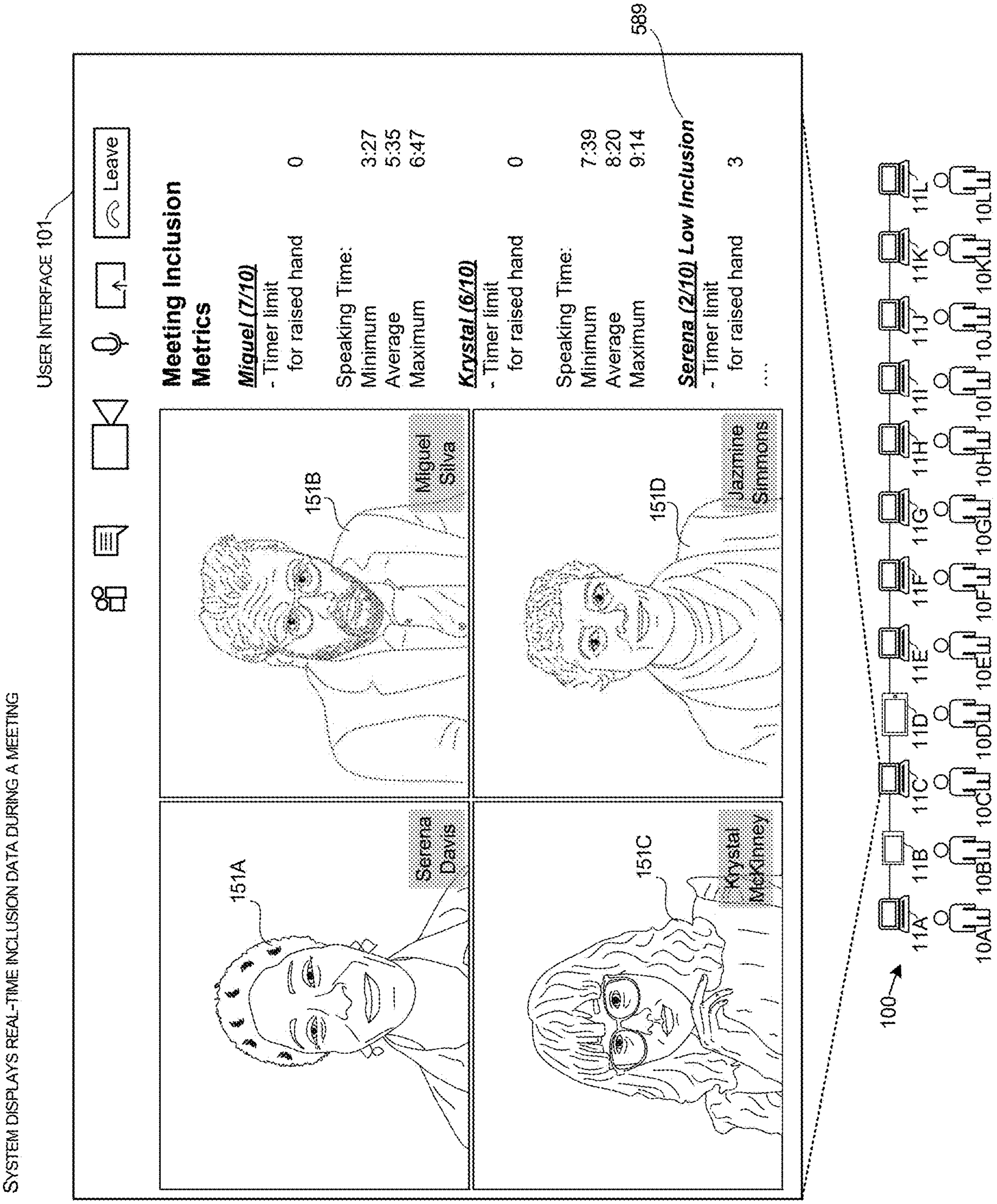
FIG. 9 illustrates an example of a user interface having real time inclusion metrics.
Figure 10:
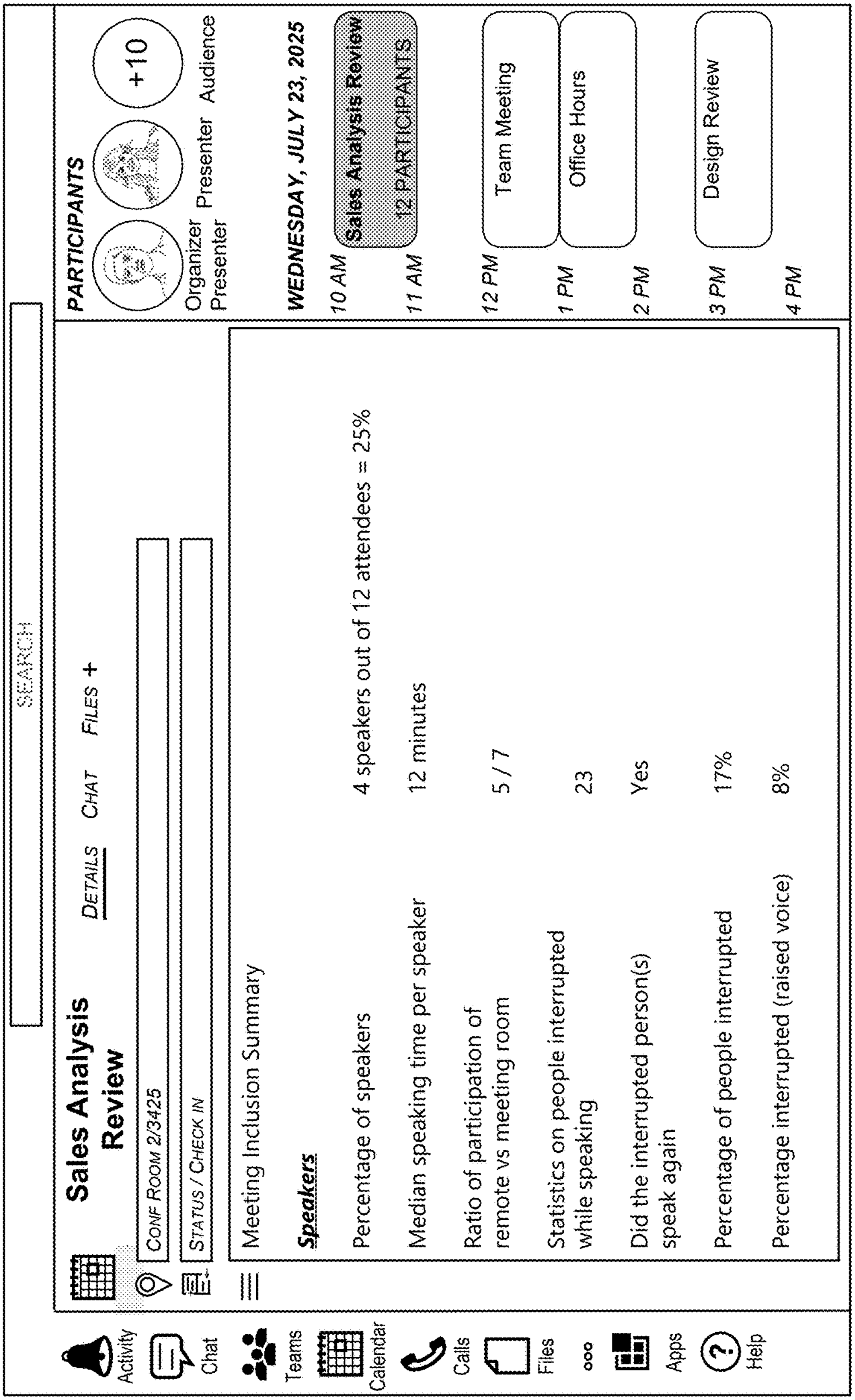
FIG. 10 illustrates an example of a user interface having post-meeting inclusion metrics.

FIG. 9 and FIG. 10 show examples of user interface arrangements having meeting inclusion metrics. As shown in FIG. 9, the system can display a number of categories of metrics that can appear in real time while the meeting is in progress, or as shown in FIG. 10, categories of metrics can be displayed after a meeting has concluded. These metrics can be displayed either to all participants or only meeting managers, such as an organizer. For example, the metrics can include values for raised hands until speaking, which can include an average, a minimum, or maximum. The metrics can include a number of speakers that spoke between raised hand and person that raised his hand speaking, percentage of speakers (e.g., did everyone speak?), median speaking time per speaker, or a ratio of participation of remote one person setup vs meeting room. The metrics can also pertain to a meeting manager or a location or room. For instance, metrics for people reporting to a manger or located in a room can be combined to measure inclusion for each particular group.

The metrics can include statistics on people interrupted while speaking (e.g., did the interrupted person/s speak again in the meeting), a percentage of people that were interrupted, a number or percentage of people that were interrupted but for raised voice, people that were ignored, e.g., a question was asked but was not answered, a percentage of topics that gave an opportunity for questions, e.g., "any questions?" The metrics can include real time indications that can be triggered upon a threshold being set. For example, upon a raised hand timeout, when a person does not speak, or a raised hand with a person speaking, as described herein.

The system can also provide notifications for people who fall below a threshold level of inclusion. If a person does not meet one of our criteria for any of the metrics disclosed herein, the system cannot provide notifications to indicate that a group of people or an individual have fallen below a threshold level of inclusion. This can include metrics for a number of attempts for a person to speak or it may include an overall count of a number of times a person attended a meeting but did not speak, etc. For example, as shown in FIG. 9, if the fourth user (User D 10D, displayed as rendering 151D) was interrupted a threshold number of times, did not raise their hand during a meeting, or did not speak a threshold number of times during a meeting, the system may provide a notification 589 indicating a low inclusion level. The system can also lower that users time threshold and response to detecting this condition. FIG. 10 also shows an example of a summary after the conclusion of a meeting.

Figure 11:
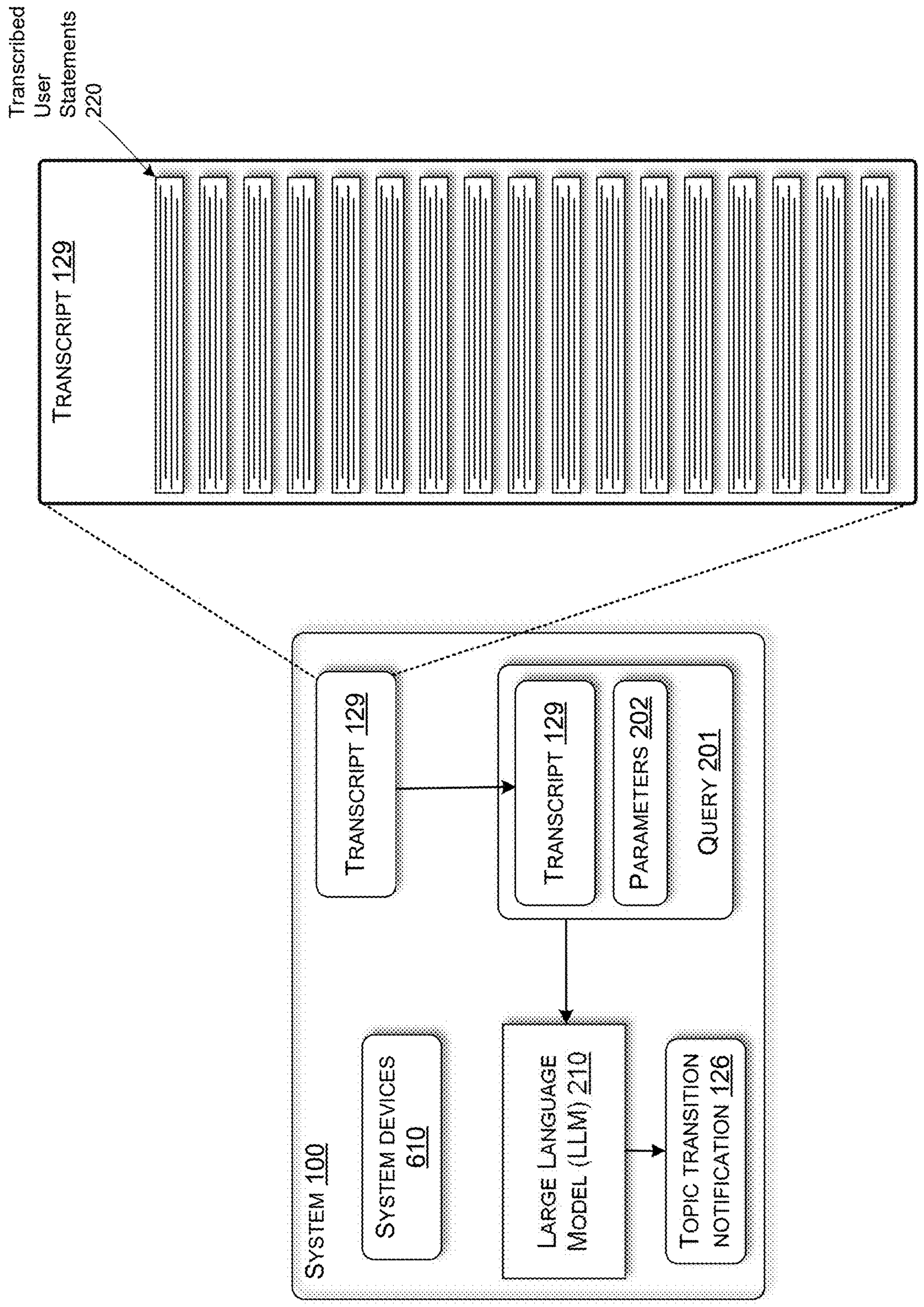
FIG. 11 illustrates aspects of a large language model and how it is used with the system.

FIG. 11 shows aspects of the system 100 that can be used to identify various events from audio streams of a meeting such as the detection of a topic transition or the detection of a person speaking after their hand raise input. This embodiment includes system devices 610 (described in more detail below) for managing the audio streams and meeting controls, a large language model (LLM) 210, which can use a query 201 to generate an output such as a topic transition notification 126. Generally described, the system can receive a transcript 129 that is derived from transcribing audio streams of a meeting. The transcript 129 includes transcribed user statements 220 and these statements can be delineated by one or more characters, and each statement can be associated with a particular user. The transcript 129 can be combined with one or more parameters 202 for building the query 201. The parameters can include a number of instructions that caused the LLM 210 to generate a notification 126 that indicates that a topic has changed in the discussion. In one illustrative example, system can send an updated set of user statements 220 during a meeting and provide instruction to the LLM to analyze each statement and determine if a new topic has been raised.

The system can also cause the LLM to generate an output to provide notifications indicating that a particular person has talked in a meeting, a particular person has had a threshold level of participation, or to generate an inclusion score for one or more meeting participants. These outputs can be caused by the use of a query defining the output along with a full meeting transcript or a live feed of segments of a transcript. This can be useful in a situation where a person has raised their hand and the system is required to make an accurate determination of whether that person had sufficient speech to indicate that they followed up to their hand raise gesture. For instance, if the first user raises their hand and says just two words, the system may determine that the user did not appropriately respond or appropriately participate at a threshold level to count as a proper response to the hand raise gesture. The system can also determine if that user has also responded to the topic that was being discussed. For example, if the person raises their hand during the first topic, and they respond with speech that relates to another unrelated topic, the system may determine that that person did not properly respond, and the system may not remove the display of their hand raised gesture, or stop the timer. However, if the person did respond with a sufficient vocal input that is on the same topic being discussed, the system will stop the timer and remove their current hand raised gesture indicator 121.

The LLM described herein can also include a trained model that is trained by the queries described herein. For instance, a first query can include a transcript of a meeting and a query parameter that instructs the LLM to record speech patterns of each user with usernames. This enables the LLM to build more accurate results in future queries that cause the LLM to provide an output indicating whether a person was able to speak to an audience, if they were interrupting other users, or if determine a level of participation or inclusion level for each user.

In one illustrative example, the system can send the received messages to a Natural Language Processing (NLP) module, which may include the use of generative AI technologies, and more specifically in one example, a large language model (LLM). Although the examples disclosed herein refer to the use of an LLM, the techniques disclosed herein can utilize any combination of suitable NLP algorithms that analyze and model interactions between devices and human language. This can include, but is not limited to, any suitable combination of algorithms such as Tokenization algorithms that divide a text into individual words or tokens; Part-of-Speech (POS) Tagging algorithms that assign grammatical labels (e.g., noun, verb, adjective) to each word in a sentence, helping to analyze sentence structure; Named Entity Recognition (NER) algorithms that identify and classify named entities, such as names of people, places, organizations, and more within a text; Sentiment Analysis algorithms that determine the sentiment or emotional tone of a piece of text, and classifying it as positive, negative, or neutral; Text Classification algorithms that categorize text documents into predefined classes or categories, such as topic classification and sentiment analysis; Machine Translation algorithms, like neural machine translation (NMT), automatically translate text from one language to another; Language Modeling algorithms, including n-grams and neural language models, an also to referred to herein as a large language model (LLM) or a "language model," are used to predict the probability of a word or sequence of words given the context of the preceding words; Named Entity Disambiguation algorithms which help disambiguate the meaning of named entities by linking them to specific entities in a knowledge base or resolving them to their appropriate entities; Text Summarization algorithms that generate concise summaries of longer texts, which can be extractive (selecting and combining sentences) or abstractive (generating new sentences); Speech Recognition algorithms, since the system may process speech messages and not just text messages; Information Extraction algorithms that identify structured information from unstructured text, for extracting events or facts from articles or message attachments; Coreference Resolution algorithms that determine which words or phrases in a text refer to the same entity, e.g., identifying that "he" and "John" refer to the same person in a sentence; Question Answering algorithms that answer questions posed in natural language by extracting relevant information from text corpora or knowledge bases; Word Embeddings algorithms that represent words as dense, continuous-valued vectors, which capture semantic relationships between words; Text Generation algorithms that use Recurrent Neural Networks (RNNs) and Transformers to create human-like text, including chatbots, content generation, and creative writing, Dependency Parsing algorithms that analyze the grammatical structure of sentences by identifying the relationships between words, including subjects, objects, and modifiers; Topic Modeling algorithms, such as Latent Dirichlet Allocation (LDA), to uncover the underlying topics in a collection of documents; and Language Generation algorithms that create coherent and contextually relevant language, such as generating human-like responses in a conversational AI system.

Figure 12:
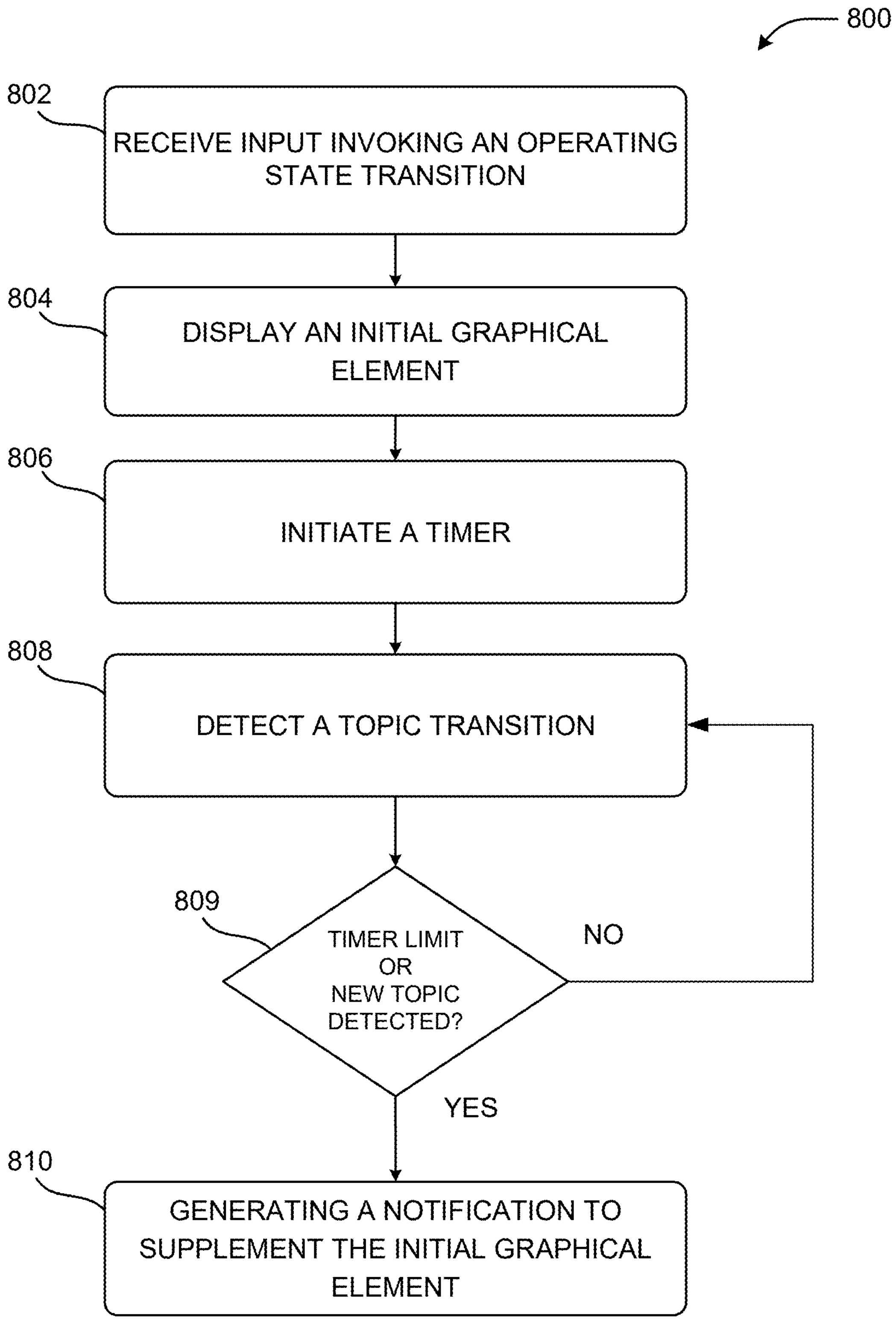
FIG. 12 is a flow diagram showing aspects of a routine for implementing the disclosed techniques.

Turning now to FIG. 12, aspects of a routine 800 that causes a generation of a dynamically controlled notification are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor or circuit of another remote computer (which can be a server) or a local processor or circuit of a local computer (which can be a client device receiving a message or a client device sending the message). Any aspect of the routine, which can include the generation of a prompt, communication of any of the messages with the prompt to an NLP algorithm, use of an NLP algorithm, or a display of a result generated by an NLP algorithm, can be performed on either a device sending a message, a device receiving a message, or on a server managing communication of the messages for a thread. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

The routine starts at operation 802 where the system receives an input invoking an operating state transition. The operating state transition changing a state of the system enables a user to communicate an audio stream to communication streams of a meeting, e.g., a communication session. The operating state transition causes a display of a graphical element, e.g., a hand raise. The examples described herein describe computer actions in response to a user raising their hand. This includes a user input or an input gesture that initiates the operating state transition and causes a notification to other users that the user has an interest in speaking, and/or causes a display of an initial hand raise image.

Next at operation 804, the system displays an initial graphical element indicating a hand raise. For example, this can include an image of a hand that is displayed in proximity to an image or a name of a user that provided the input.

Next, at operation 806, the system initiates a timer for measuring an elapsed time. At operation 808, the system analyzes audio streams of the communication session to detect a topic transition. At operation 809, the system determines if the timer reaches limit or if a new topic is detected. If the timer does not reach a limit or if a new topic is not detected, the routine returns to operation 808 where the system further analyzes the meeting audio streams for a new topic. However, if the timer reaches the limit or if a new topic is detected, based on a time of whichever condition is met first, the routine proceeds to operation 810 where the system generates a second notification to supplement the initial graphical element. The second notification includes at least one of an audio signal 128A generated at individual computing devices, or a supplemental graphical indicator 128B for emphasizing a rendering 151A of the participant 10A or an identifier of the participant 10A, where the supplemental graphical indicator 128B is displayed at each of the individual computing devices, or at individual computing devices such as the moderators computer or other computers other than the person that provided the input.

Figure 13:
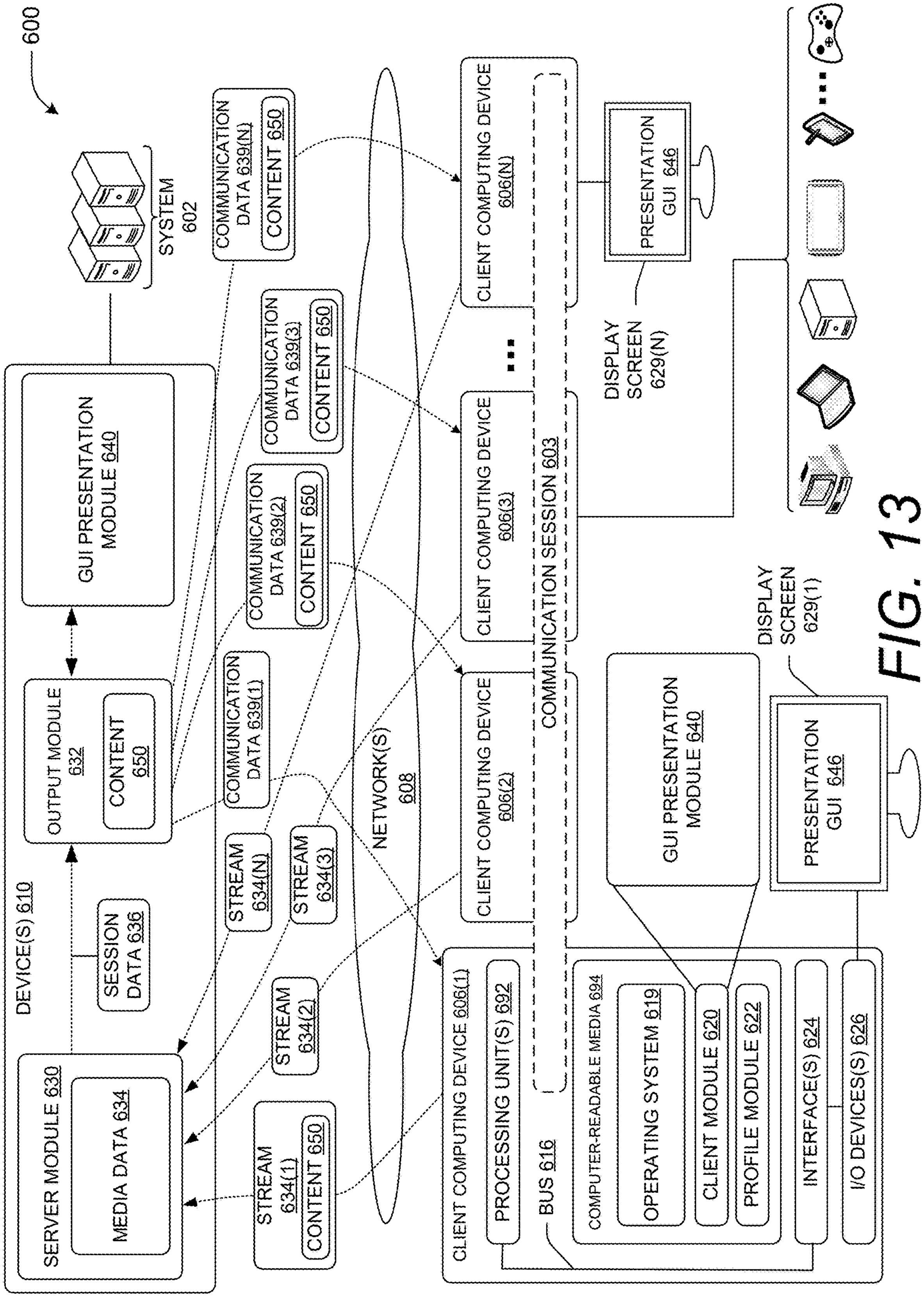
FIG. 13 is a diagram illustrating a distributed computing environment capable of implementing aspects of the techniques and technologies presented herein.

FIG. 13 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds can be communicated with the messages.

The system 602 of FIG. 13 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses. Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 13 illustrates that client computing device 606(1) is in some way connected to a display device (e.g., a display screen 629(N)), which can display a UI according to the techniques described herein.

In the example environment 600 of FIG. 13, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 13) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 13, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 14:
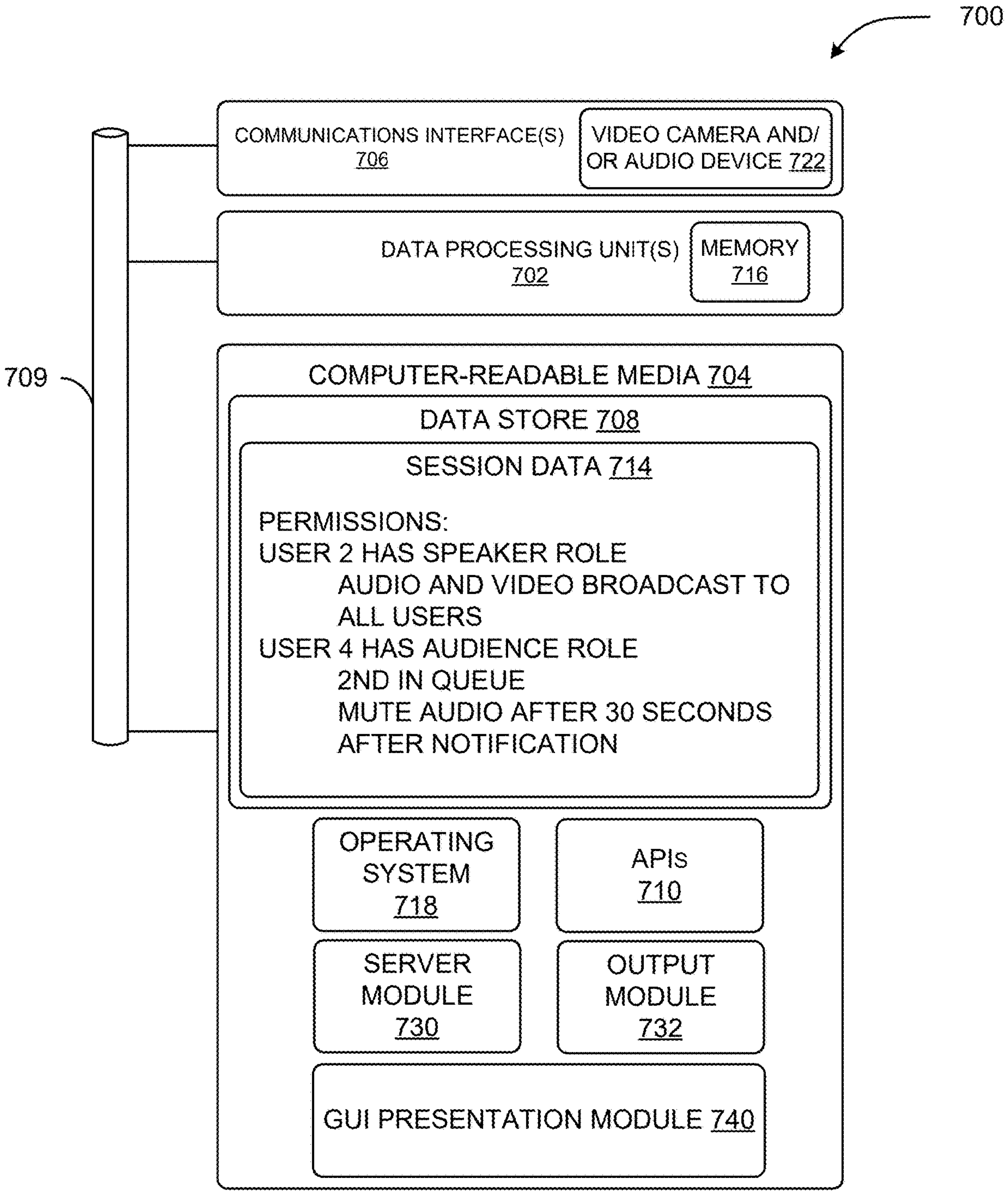
FIG. 14 is a computer architecture diagram illustrating a computing device architecture for a computing device capable of implementing aspects of the techniques and technologies presented herein.

FIG. 14 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device

700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 13), profile data (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include session data 714, such as the content that includes video, audio, or other content that can be shared in a chat thread. This the session data 714 can also include permissions for each user. For example, a role of a designated presenter can be granted to User 2 and User 4 can have an audience role, where their speech is monitored to determine if they are interrupting the designated presenter. Other rules are defined as well, e.g., when the system mutes User 4, etc.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

The following clauses are to supplement the present disclosure.

Clause A: A method for generating dynamically controlled notifications for improving inclusiveness for a participant 10A of a communication session, the method for execution on a system 100, the method comprising: FIG. 2B shows a user raising their hand button, gesture, or AI showing interest to speak this is a request to activate speaking mode for the user, e.g., activate microphone, this includes receiving an input from a computing device 11A of a participant 10A for invoking an operating state transition of the system 100; FIG. 2B shows after a "raised hand" function was invoked, a meeting system automatically sets a timer associated with the "raised hand", this includes in response to the input from the computing device 11A of the participant 10A for invoking the operating state transition of the system: FIG. 2B: display the first hand raise graphical indicator to the others causing a display of a graphical element 121 indicating the input from the first computing device, the display of the graphical element 121 displayed on individual computing devices 11B-11L of participants 10B-10L of the communication session; and analyzing, using a trained generative language model, one or more audio streams of the communication session for detecting a topic transition 126 of a discussion 127 that is communicated through verbal speech encoded in the one or more audio streams; FIG. 2E shows that the meeting system triggers an audio or visual indicator in response to a preset condition is met. The present condition includes: 1 timeout of the timer; or 2 a detection that the discussion topic has switched. in response to the detection of the topic transition, selectively generating a notification 128 to supplement the graphical element 121 displayed on the individual computing devices, the notification 128 including at least one of: an audio signal 128A generated at the individual computing devices, or a supplemental graphical indicator 128B for emphasizing a rendering 151A of the participant 10A or an identifier of the participant 10A.

Clause B: the method of clause A, further comprising: analyzing a timer to determine that an elapsed time 123 from a time 124 of an input received at the first computing device has exceeded a threshold time limit 125; and displaying the elapsed time concurrently with the threshold time limit in proximity to a rendering of the participant or an identifier of the participant, wherein the timer for measuring the elapsed time 123 is initiated from a time 124 the input is received from the first computing device 11A to the elapsed time 123.

Clause C: the method of clauses A and B, further comprising: analyzing a timer to determine that an elapsed time 123 from a time 124 of an input received at the first computing device has exceeded a threshold time limit 125; and displaying a countdown that starts at a value of the threshold time limit and counts down to zero, which is at a time the notification is generated.

Clause D: the method of clauses A-C, as shown in FIG. 5, and adjustment of the time threshold based on unsuccessful hand raises. For example, if the timer hits a 2-minute threshold a predetermined number of times, e.g., 3 times, the system reduces that participant's time threshold, the method further comprising: analyzing a timer to determine that an elapsed time 123 from a time 124 of an input received at the first computing device has exceeded a threshold time limit 125; and determining that the elapsed time has exceeded the threshold time limit a predetermined number of times; and in response to determining that the elapsed time has exceeded the threshold time limit the predetermined number of times, reducing the threshold time limit.

Clause E: the method of clauses A-D, as shown in FIG. 6, the system includes an equal opportunity approach, Time Threshold adjustment after successful hand raises. the method further comprising: receiving an input from a second computing device of a second participant for invoking an operating state transition of the system 100 granting the second participant with speaker permissions; determining that the system received a response including an audio input from the first participant for inclusion in the one or more audio streams that follows the input is received from the first computing device; in response to determining that the system received the response at least a threshold number of times, wherein the response includes the audio input from the first participant for inclusion in the one or more audio streams that follows the input, adjusting a second threshold time limit for the second user to be shorter than the threshold time limit for the first participant; and generating a second notification to supplement a second graphical element displayed in proximity to a rendering of the second participant, the second notification including at least one of: a second audio signal generated at the individual computing devices indicating that the second participant is waiting to speak, or a second supplemental graphical indicator for emphasizing the rendering of the second participant or a second identifier of the second participant.

Clause F: the method of clauses A-E, as shown in FIG. 7, the time threshold adjustment is based on # of raised hands & remaining meeting time, further comprising: determining a remaining time of the communication session; determining a number of participants that have submitted one or more inputs invoking the operating state transition of the system to grant the number of participants with speaker permissions; and determining a value for the threshold time limit based on the remaining time of the communication session and the number of participants that have submitted one or more inputs invoking the operating state transition.

Clause F: the method of clauses A-E, as shown in FIG. 2F, the system transitions to an operating state where the first user speaks and contributes to the meeting audio and transcript, further comprising: receiving an input to modify permissions from a first operating state to a second operating state, wherein the first operating state restricts the first computing device from communicating an audio stream from the computing device to the one or more audio streams of the communication session, and the second operating state allows the first computing device to communicate the audio stream to the one or more audio streams of the communication session; and receiving the audio stream from the first computing device for inclusion of verbal input of the first participation to the one or more audio streams of the communication session and a transcript recording the discussion.

Clause G: A method for generating dynamically controlled notifications for improving inclusiveness for a participant 10A of a communication session, the method for execution on a system 100, the method comprising: FIG. 2B: User raises hand button, gesture, or AI showing interest to speak this is a request to activate speaking mode for the user, e.g., activate microphone receiving an input from a computing device 11A of a participant 10A for invoking an operating state transition of the system 100; FIG. 2B: After a "raised hand" function was invoked, a meeting system automatically sets a timer associated with the "raised hand" in response to the input from the computing device 11A of the participant 10A for invoking the operating state transition of the system: FIG. 2B: display the first hand raise graphical indicator to the others causing a display of a graphical element 121 indicating the input from the first computing device, the display of the graphical element 121 displayed on individual computing devices 11B-11L of participants 10B-10L of the communication session; FIG. 2B: monitor an elapsed time from the hand raise initiate a timer 122 for measuring an elapsed time 123 from a time 124 the input is received from the first computing device 11A; FIG. 2C: Determine if a new topic is being discussed or determine if timer has met the criteria analyzing one or more audio streams of the communication session for detecting a topic transition 126 of a discussion 127 that is communicated through verbal speech encoded in the one or more audio streams; analyze the timer to determine that the elapsed time 123 from the time 124 of the input has exceeded a threshold time limit 125; and FIG. 2E: The meeting system triggers an audio or visual indicator in response to a preset condition is met, the present condition includes: 1 timeout of the timer; or 2 a detection that the discussion topic has switched. Regarding Reference 3: claim has both analysis of a topic change and a timer, and trigger is from the earlier of the two events, not just timer after hand raise in response to analyzing the one or more audio streams of the communication session to identify the topic transition and analyzing the timer determine that the elapsed time 123 from the time 124 of the input has exceeded the threshold time limit 125, based on a first occurrence of either the detection of the topic transition or the elapsed time exceeding the threshold time limit, generating a notification 128 to supplement the graphical element 121 displayed on the individual computing devices, the notification 128 including at least one of: an audio signal 128A generated at the individual computing devices, or a supplemental graphical indicator 128B for emphasizing a rendering 151A of the participant 10A or an identifier of the participant 10A.

Clause H: the method of clause G, FIGS. 3A-3B show a display of an elapsed time counter, the method further comprising: displaying the elapsed time concurrently with the threshold time limit in proximity to a rendering of the participant or an identifier of the participant.

Clause I: the method of clauses G-H, FIGS. 4A-4B: display of a countdown to the time limit, the method further comprising: displaying a countdown that starts at a value of the threshold time limit and counts down to zero, which is at a time the notification is generated.

Clause J: the method of clauses G-I, as shown in FIG. 5, an adjustment of the time threshold based on unsuccessful hand raises, for example, if the timer hits a 2-minute threshold a predetermined number of times, e.g., 3 times, the system reduces that participant's time threshold, the method further comprising: determining that the elapsed time from the time of the input has exceeded the threshold time limit a predetermined number of times; and in response to determining that the elapsed time from the time of the input has exceeded the threshold time limit the predetermined number of times, reducing the threshold time limit.

Clause K: the method of clauses G-J, as shown in FIG. 6, the system includes equal opportunity approach, where the threshold adjustment after successful hand raises.

Clause L: the method of clauses G-K, wherein the participant 10A is a first participant 10A, the method further comprising: receiving an input from a second computing device of a second participant for invoking an operating state transition of the system 100 granting the second participant with speaker permissions; determining that the system received a response including an audio input from the first participant for inclusion in the one or more audio streams that follows the input is received from the first computing device; in response to determining that the system received the response at least a threshold number of times, wherein the response includes the audio input from the first participant for inclusion in the one or more audio streams that follows the input, adjusting a second threshold time limit for the second user to be shorter than the threshold time limit for the first participant; and generating a second notification to supplement a second graphical element displayed in proximity to a rendering of the second participant, the second notification including at least one of: a second audio signal generated at the individual computing devices indicating that the second participant is waiting to speak, or a second supplemental graphical indicator for emphasizing the rendering of the second participant or a second identifier of the second participant.

Clause M: the method of clauses G-L, as shown in FIG. 7, the time threshold adjustment is based on a number of raised hands & remaining meeting time, the method further comprising: determining a remaining time of the communication session; determining a number of participants that have submitted one or more inputs invoking the operating state transition of the system to grant the number of participants with speaker permissions; and determining a value for the threshold time limit based on the remaining time of the communication session and the number of participants that have submitted one or more inputs invoking the operating state transition.

Clause N: the method of clauses G-M, as shown in FIG. 8, the time threshold adjustment is based meeting type, e.g., All-Hands vs small group meeting, and/or organizational ranking of participants, the method further comprising: determining an organizational rank of one or more participants; determining a meeting type of the communication session; and determining a value for the threshold time limit based on the organizational rank of one or more participants and the meeting type of the communication session.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for generating dynamically controlled notifications for improving inclusiveness for a participant of a communication session, the method for execution on a system, the method comprising:

receiving an input from a computing device of a participant for invoking an operating state transition of the system;

in response to the input from the computing device of the participant for invoking the operating state transition of the system:

causing a display of a graphical element indicating the input from the first computing device, the display of the graphical element displayed on individual computing devices of participants of the communication session;

analyzing, using a trained generative language model, one or more audio streams of the communication session for detecting a topic transition of a discussion that is communicated through verbal speech encoded in the one or more audio streams;

in response to the detection of the topic transition, selectively generating a notification to supplement the graphical element displayed on the individual computing devices, the notification including at least one of:

an audio signal generated at the individual computing devices, or a supplemental graphical indicator for emphasizing a rendering of the participant or an identifier of the participant.

2. The method of claim 1, further comprising:

analyzing a timer to determine that an elapsed time from a time of an input received at the first computing device has exceeded a threshold time limit; and displaying the elapsed time concurrently with the threshold time limit in proximity to a rendering of the participant or an identifier of the participant, wherein the timer for measuring the elapsed time is initiated from a time the input is received from the first computing device to the elapsed time.

3. The method of claim 1, further comprising:

analyzing a timer to determine that an elapsed time from a time of an input received at the first computing device has exceeded a threshold time limit; and displaying a countdown that starts at a value of the threshold time limit and counts down to zero, which is at a time the notification is generated.

4. The method of claim 1, further comprising:

analyzing a timer to determine that an elapsed time from a time of an input received at the first computing device has exceeded a threshold time limit; and determining that the elapsed time has exceeded the threshold time limit a predetermined number of times; and in response to determining that the elapsed time has exceeded the threshold time limit the predetermined number of times, reducing the threshold time limit.

5. The method of claim 1, wherein the participant is a first participant, the method further comprising:

receiving an input from a second computing device of a second participant for invoking an operating state transition of the system granting the second participant with speaker permissions;

determining that the system received a response including an audio input from the first participant for inclusion in the one or more audio streams that follows the input is received from the first computing device;

in response to determining that the system received the response at least a threshold number of times, wherein the response includes the audio input from the first participant for inclusion in the one or more audio streams that follows the input, adjusting a second threshold time limit for the second user to be shorter than the threshold time limit for the first participant; and generating a second notification to supplement a second graphical element displayed in proximity to a rendering of the second participant, the second notification including at least one of:

a second audio signal generated at the individual computing devices indicating that the second participant is waiting to speak, or a second supplemental graphical indicator for emphasizing the rendering of the second participant or a second identifier of the second participant.

6. The method of claim 1, further comprising:

determining a remaining time of the communication session;

determining a number of participants that have submitted one or more inputs invoking the operating state transition of the system to grant the number of participants with speaker permissions; and determining a value for the threshold time limit based on the remaining time of the communication session and the number of participants that have submitted one or more inputs invoking the operating state transition.

7. The method of claim 1, further comprising:

determining an organizational rank of one or more participants;

determining a meeting type of the communication session; and determining a value for the threshold time limit based on the organizational rank of one or more participants and the meeting type of the communication session.

8. The method of claim 1, further comprising:

receiving an input to modify permissions from a first operating state to a second operating state, wherein the first operating state restricts the first computing device from communicating an audio stream from the computing device to the one or more audio streams of the communication session, and the second operating state allows the first computing device to communicate the audio stream to the one or more audio streams of the communication session;

receiving the audio stream from the first computing device for inclusion of verbal input of the first participation to the one or more audio streams of the communication session and a transcript recording the discussion.

9. A computing system for generating dynamically controlled notifications for improving inclusiveness for a participant of a communication session, the computing system comprising:

one or more processing units; and a computer-readable storage medium having encoded thereon computer-executable instructions to cause the one or more processing units to:

receive an input from a computing device of a participant for invoking an operating state transition of the system granting the participant with speaker permissions;

in response to the input from the computing device of the participant for invoking the operating state transition of the system:

cause a display of a graphical element indicating the input from the first computing device, the display of the graphical element displayed on individual computing devices of participants of the communication session;

analyzing one or more audio streams of the communication session for detecting a topic transition of a discussion that is communicated through verbal speech encoded in the one or more audio streams;

in response to the detection of the topic transition, selectively generate a notification to supplement the graphical element displayed on the individual computing devices, the notification including at least one of:

an audio signal generated at the individual computing devices, or a supplemental graphical indicator for emphasizing a rendering of the participant or an identifier of the participant.

10. The computing system of claim 9, wherein the instructions further to cause the one or more processing units to: display the elapsed time concurrently with the threshold time limit in proximity to a rendering of the participant or an identifier of the participant.

11. The computing system of claim 9, wherein the instructions further to cause the one or more processing units to: display a countdown that starts at a value of the threshold time limit and counts down to zero, which is at a time the notification is generated.

12. The computing system of claim 9, wherein the instructions further to cause the one or more processing units to:
determine that the elapsed time has exceeded the threshold time limit a predetermined number of times; and
reduce the threshold time limit in response to determining that the elapsed time has exceeded the threshold time limit the predetermined number of times.

13. The computing system of claim 9, wherein the participant is a first participant, wherein the instructions further to cause the one or more processing units to:
receiving an input from a second computing device of a second participant for invoking an operating state transition of the system granting the second participant with speaker permissions;
determining that the system received a response including an audio input from the first participant for inclusion in the one or more audio streams that follows the input is received from the first computing device;
in response to determining that the system received the response at least a threshold number of times, wherein the response includes the audio input from the first participant for inclusion in the one or more audio streams that follows the input, adjusting a second threshold time limit for the second user to be shorter than the threshold time limit for the first participant; and
generating a second notification to supplement a second graphical element displayed in proximity to a rendering of the second participant, the second notification including at least one of:
a second audio signal generated at the individual computing devices indicating that the second participant is waiting to speak, or
a second supplemental graphical indicator for emphasizing the rendering of the second participant or a second identifier of the second participant.

14. The computing system of claim 9, wherein the instructions further to cause the one or more processing units to:
determining a remaining time of the communication session;
determining a number of participants that have submitted one or more inputs invoking the operating state transition of the system to grant the number of participants with speaker permissions; and
determining a value for the threshold time limit based on the remaining time of the communication session and the number of participants that have submitted one or more inputs invoking the operating state transition.

15. The computing system of claim 9, wherein the instructions further to cause the one or more processing units to:
determine an organizational rank of one or more participants;
determine a meeting type of the communication session; and
determine a value for the threshold time limit based on the organizational rank of one or more participants and the meeting type of the communication session.

16. A computer-readable storage medium having encoded thereon computer-executable instructions for generating dynamically controlled notifications for improving inclusiveness for a participant of a communication session, the computer-executable instructions configured to cause the one or more processing units of a computing system to:
receive an input from a computing device of a participant for invoking an operating state transition of the system granting the participant with speaker permissions;
in response to the input from the computing device of the participant for invoking the operating state transition of the system:
cause a display of a graphical element indicating the input from the first computing device, the display of the graphical element displayed on individual computing devices of participants of the communication session;
analyzing one or more audio streams of the communication session for detecting a topic transition of a discussion that is communicated through verbal speech encoded in the one or more audio streams;
in response to the detection of the topic transition or the elapsed time exceeding the threshold time limit,
generate a notification to supplement the graphical element displayed on the individual computing devices, the notification including at least one of:
an audio signal generated at the individual computing devices, or
a supplemental graphical indicator for emphasizing a rendering of the participant or an identifier of the participant.

17. The computer-readable storage medium of claim 16, wherein the instructions further to cause the one or more processing units to:
determine that an elapsed time from a time of an input has exceeded the threshold time limit a predetermined number of times; and
reduce the threshold time limit in response to determining that the elapsed time has exceeded the threshold time limit the predetermined number of times.

18. The computer-readable storage medium of claim 16, wherein the participant is a first participant, wherein the instructions further to cause the one or more processing units to:
receiving an input from a second computing device of a second participant for invoking an operating state transition of the system granting the second participant with speaker permissions;
determining that the system received a response including an audio input from the first participant for inclusion in the one or more audio streams that follows the input is received from the first computing device;
in response to determining that the system received the response at least a threshold number of times, wherein the response includes the audio input from the first participant for inclusion in the one or more audio streams that follows the input, adjusting a second threshold time limit for the second user to be shorter than the threshold time limit for the first participant; and
generating a second notification to supplement a second graphical element displayed in proximity to a rendering of the second participant, the second notification including at least one of:
a second audio signal generated at the individual computing devices indicating that the second participant is waiting to speak, or
a second supplemental graphical indicator for emphasizing the rendering of the second participant or a second identifier of the second participant.

19. The computer-readable storage medium of claim 16, wherein the instructions further to cause the one or more processing units to:

determining a remaining time of the communication session;

determining a number of participants that have submitted one or more inputs invoking the operating state transition of the system to grant the number of participants with speaker permissions; and determining a value for the threshold time limit based on the remaining time of the communication session and the number of participants that have submitted one or more inputs invoking the operating state transition.

20. The computer-readable storage medium of claim 16, wherein the instructions further to cause the one or more processing units to:

determine an organizational rank of one or more participants;

determine a meeting type of the communication session; and determine a value for the threshold time limit based on the organizational rank of one or more participants and the meeting type of the communication session.

* * * * *